US011309792B2

(12) United States Patent
Iqbal et al.

(10) Patent No.: US 11,309,792 B2
(45) Date of Patent: Apr. 19, 2022

(54) VOLTAGE CONVERTER CIRCUIT

(71) Applicant: Ferroelectric Memory GmbH, Dresden (DE)

(72) Inventors: Rashid Iqbal, Dresden (DE); Fabio Tassan Caser, Dresden (DE); Marko Noack, Dresden (DE)

(73) Assignee: FERROELECTRIC MEMORY GMBH, Dresden (DE)

( * ) Notice: Subject to any disclaimer, the term of this patent is extended or adjusted under 35 U.S.C. 154(b) by 0 days.

(21) Appl. No.: 17/238,526

(22) Filed: Apr. 23, 2021

(65) Prior Publication Data

US 2021/0336534 A1    Oct. 28, 2021

(30) Foreign Application Priority Data

Apr. 24, 2020 (DE) .......................... 102020111275.0

(51) Int. Cl.
*H02M 3/07* (2006.01)
(52) U.S. Cl.
CPC ..................... *H02M 3/07* (2013.01)
(58) Field of Classification Search
CPC ...................................... H02M 3/07
See application file for complete search history.

(56) References Cited

U.S. PATENT DOCUMENTS

| 6,023,188 | A | * | 2/2000 | Lee | ........................... G05F 3/20 |
| | | | | | 327/536 |
| 6,418,040 | B1 | | 7/2002 | Meng | |
| 2001/0022735 | A1 | * | 9/2001 | Zanuccoli | ............. H02M 3/073 |
| | | | | | 363/60 |
| 2013/0214853 | A1 | | 8/2013 | Lin | |
| 2019/0123638 | A1 | | 4/2019 | Rana | |

OTHER PUBLICATIONS

German Patent Office, "Office Action" in application No. 10 2020 111 275.0, dated Apr. 23, 2021, 112pgs.

* cited by examiner

*Primary Examiner* — Sibin Chen
(74) *Attorney, Agent, or Firm* — Hickman Becker Bingham Ledesma LLP; Malgorzata A. Kulczycka

(57) ABSTRACT

A voltage converter circuit may include: a first input node; a second input node; a first output node; a second output node; one or more charge pumps that convert a first input voltage supplied to the first input node up to a first output voltage and convert a second input voltage supplied to the second input node down to a second output voltage; and a control circuit to control the one or more charge pumps according to two operational modes. In the first operation mode, the control circuit supplies the first input voltage to the first input node, leaves the second input node floating, and outputs the first output voltage at the first output node. In the second operation mode, the control circuit supplies the second input voltage to the second input node, leaves the first input node floating, and outputs the second output voltage at the second output node.

18 Claims, 12 Drawing Sheets

VOLTAGE CONVERTER CIRCUIT

CROSS-CITING TO RELATED APPLICATIONS

This application claims priority to German Application 10 2020 111 275, which was filed on Apr. 24, 2020, the entirety of both of which is incorporated herein fully by reference.

TECHNICAL FIELD

Various aspects relate to a voltage converter circuit.

BACKGROUND

Conventionally, circuits are optimized to maximize their signal-to-noise ratio, maximize their power efficiency, or minimize their manufacturing costs. Among others, elevated voltages are used as optimization parameters, e.g., to reduce the signal-to-noise ratio and increase the efficiency. Also, various types of functions may require elevated voltages for their operation, e.g., such as sensors, switches, storage elements or other semiconductor elements. Conventionally, elevated voltages are generated within the circuit by one or more charge pumps. The general principle of a charge pump is based on a discontinuous charge transfer process, by which charges are transferred towards the higher voltage. This principle allows for stacking of multiple charge pumps, such that the charges are transferred from one charge pump to another charge pump. The higher the required voltage is, the more charge pumps may be stacked.

However, the higher voltage also affects the components of the charge pump, e.g., thereby increasing power losses or exceeding isolation barriers. Also, the charge pumps increase the size of the circuit, e.g., thereby increasing manufacturing costs. Thus, the application of charge pumps partially counteracts the benefit of the elevated voltage.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
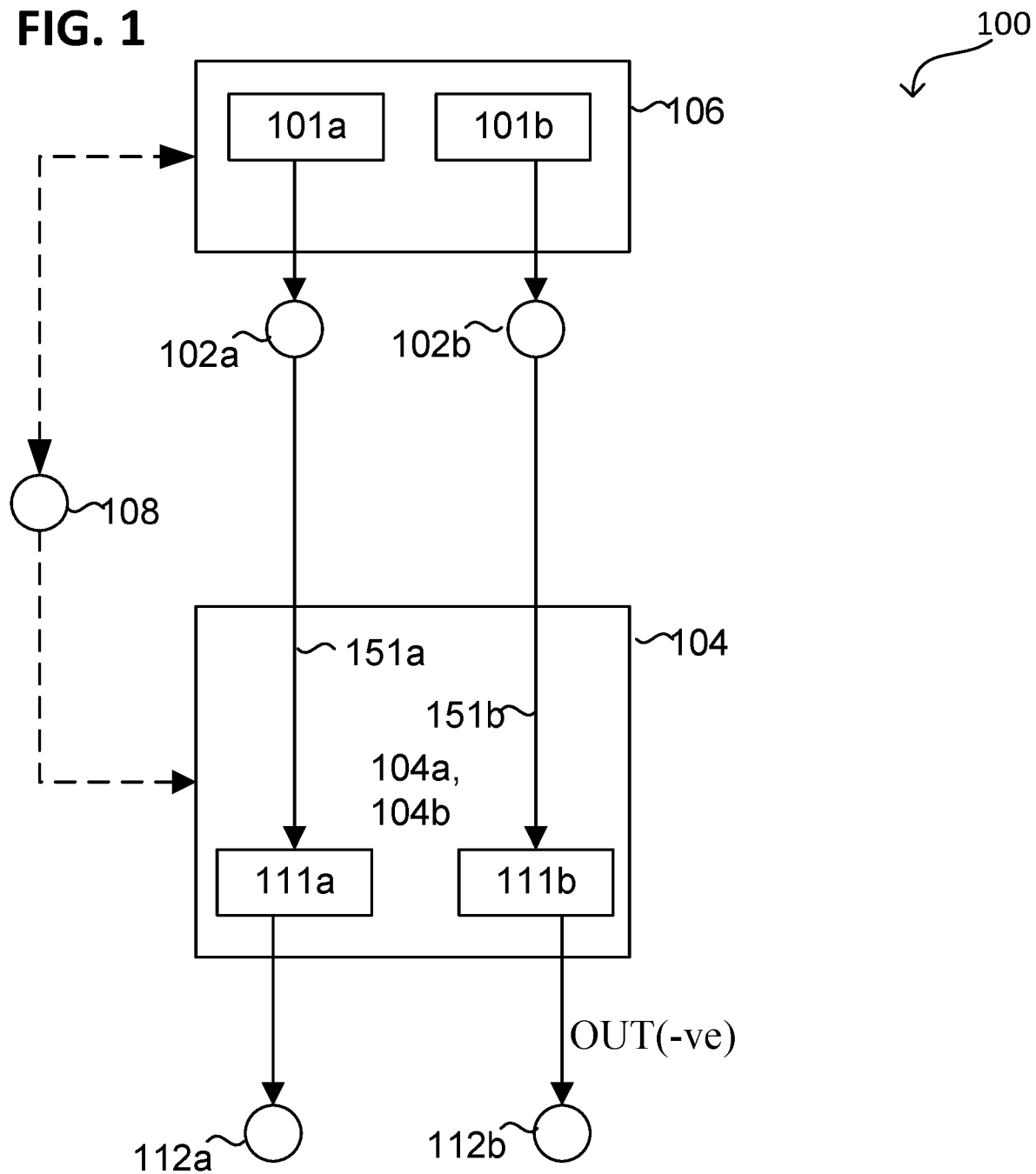
FIGS. 1 and 2 respectively show a voltage converter circuit in a schematic circuit diagram, according to various aspects.

The following detailed description refers to the accompanying drawings that show, by way of illustration, specific details, and aspects in which the disclosure may be practiced. These aspects are described in sufficient detail to enable those skilled in the art to practice the disclosure. Other aspects may be utilized, and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The terms "at least one" and "one or more" may be understood to include any integer number greater than or equal to one, i.e., one, two, three, four, [ . . . ], etc. The term "a plurality" may be understood to include any integer number greater than or equal to two, i.e., two, three, four, five, [ . . . ], etc.

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, a plurality of a multiple of listed elements, or each of the listed elements. For example, the phrase "at least one of" may be used herein to mean "one", "more than one" or "each".

The term "connected" may be used herein with respect to nodes, integrated circuit elements, and the like, to mean electrically connected, which may include a direct connection or an indirect connection, wherein an indirect connection may only include additional structures in the current path that do not influence the substantial functioning of the described circuit or device. The term "electrically conductively connected" that is used herein to describe an electrical connection between one or more terminals, nodes, regions, contacts, etc., may be understood as an electrically conductive connection (e.g., an ohmic connection) with, for example, ohmic behavior, e.g., provided by a metal or degenerate semiconductor in absence of p-n junctions in the current path. The term "electrically conductively connected" may be also referred to as "galvanically connected." The impedance of an ohmic connection may include a reactance (e.g., capacitance related and/or inductance related) less than resistance (ohmic) or substantially no reactance. Reactance and resistance are components of the impedance.

In the following, reference is made to various circuit components, such as switches or charge storages. Examples for circuit components may include a transistor (e.g., for implementing a switch), a resistor and a capacitor (e.g., for implementing a charge storage or a capacitive coupling). According to various aspects, the circuit components may be implemented according to various types of semiconductor technology, such as group IV semiconductor (e.g., silicon or germanium) based semiconductor technology, group III-V semiconductor (e.g., gallium arsenide) based semiconductor technology, group III semiconductor based semiconductor technology, group V semiconductor based semiconductor technology, ternary semiconductor compound based semiconductor technology, or semiconducting polymer based semiconductor technology, for example. According to various aspects, the circuit components may be integrated into a substrate to form an integrated circuit.

In the following, reference is made to various voltages, among others such as $V_{th}$, VDD and VSS.

Herein, $V_{th}$ refers to the threshold voltage of a circuit component in a given semiconductor technology. The threshold voltage may be inherent to the circuit component, e.g., a field-effect transistor (FET). For example, the threshold voltage $V_{th}$ of a FET is the minimum gate-to-source voltage that is needed to create a conducting path between source and drain of the FET. As example, multiple circuit components of the same type within the circuit (or within a functional group of the circuit) may be substantially identical in their threshold voltage. In this case, the threshold voltage may be indicated for a single circuit component of the circuit (or functional group), and may be understood as applying also to other circuit components of the same type (if present) in the circuit (or functional group).

Herein, VDD refers to the supply voltage in the given semiconductor technology, e.g., as supplied to the circuit. For example, VDD may be in the range between about 2 volt and 5 volts. VDD may be provided by a power source connected to an input of the respective circuit.

Among others, VSS refers to a base voltage in the given semiconductor technology. As example, VSS may be ground, but however, may also differ from ground. Optionally, one or more other base voltages may be used in the given semiconductor technology, e.g., differing from VSS. For a facilitated understanding, the value of VSS is normalized herein to be zero. Reference made herein to various voltages use VSS as reference. In this metric, VDD may be positive, that is VDD>VSS. For example, the indication of VDD=3.3 volts may be understood as corresponding to VDD−VSS=3.3 volts, e.g., regardless of whether VSS is equal to ground, zero or another value. Said differently, VSS refers to the reference voltage. For a facilitated understanding, a voltage differing from VSS (e.g., by VDD or more) is represented by the value 1 (or the state "high"); and a voltage being equal to VSS is represented by the value 0 (or the state "low").

The term "non-floating" may be used herein with respect to elements, such as nodes, circuit elements, and the like, to mean an electrically conductive (direct or indirect) connection between an electrical potential difference, e.g., between a supply voltage and a base voltage, e.g., ground. As result, the voltage of the non-floating element (e.g., node or circuit element) is defined by a current flow driven by the electrical potential difference and flowing through the non-floating element. Said otherwise, the non-floating element may be part of an electrically conductive path (e.g., coupled between two parts of the electrically conductive path), along which electrical charges are exchanged through the non-floating element. For example, the non-floating element may be in an electrical equilibrium, such that the current received by the non-floating element equals the current output by the non-floating element.

The term "floating" may be used herein with respect to elements, such as nodes, circuit elements, and the like, to mean that the electrically conductive path is interrupted (e.g., at the floating element) or not present. Illustratively, the floating element may be a dead end of an electrically conducting path. As result, the voltage of the floating element (e.g., node or circuit element) is mainly induced by charge accumulation within the floating element (being in a non-equilibrium). Said otherwise, the current to the floating element and from the floating element may differ from each other (e.g., only occur after each other), such that the voltage of the floating element may be a result of charge accumulation by the floating element, rather than a result of a current through the floating element. For example, the current to the floating element may take the same path as the current from the floating element.

Reference is made herein to a control circuit. The control circuit may be configured to provide one or more input voltages, one or more control signals, one or more switching signals, and/or one or more operation mode voltages. For example, the control circuit may be configured to operate one or more switches of the voltage converter circuit, control charging of one or more charge storages of the voltage converter circuit, and/or control one or more voltage levels within the voltage converter circuit.

According to various aspects, the benefit of one or more charge pumps is increased, e.g., in comparison to counteracting effects, such as power losses, fabrication costs, circuit complexity as examples, and the like. Among others, the number of charge pumps sufficient for generating a certain voltage is reduced, e.g., by using the same charge pump for both, down-conversation, and up-conversation. Among others, the voltage limit for down-conversation and/or up-conversation is increased, e.g., by using a triple well configuration and/or a bipolar isolating well, in which one or more circuit components are embedded. Among others, the power losses of the circuit are reduced, e.g., by biasing the charge pump properly, e.g., depending on whether the charge pump is used for down-conversation or up-conversation. Among others, the operation of multiple charge pumps is facilitated, e.g., by operating multiple charge pumps based on their input voltage. For example, the complexity of the circuit (e.g., voltage converter circuit) is reduced, e.g., by reducing the number of circuit components per charge pump and/or reducing the complexity of the respective control circuit.

FIG. 1 illustrates a voltage converter circuit 100 according to various aspects in a schematic circuit diagram. The voltage converter circuit 100 includes multiple input nodes, e.g., including at least a first input node 102a and a second input node 102b. The voltage converter circuit 100 includes further multiple output nodes, e.g., including at least a first output node 112a and a second output node 112b.

The voltage converter circuit 100 further includes a charge pumping device 104 coupled between the multiple input nodes and the multiple output nodes. The charge pumping device 104 is formed from one or more (e.g., N) charge pumps 104a, 104b as described later in detail. In general, the number N of charge pumps of the pumping device 104a, 104b may be configured according to requirements, e.g., N≥1, N≥2, N≥3, N≥4, N≥5, N≥10, N≥20 or more.

The charge pumping device 104 is configured to convert 151a a first input voltage 101a at the first input node 102a up (that is by up-conversation 151a) to a first output voltage 111a (also referred as to OUT(+ve)). That is, the first output voltage 111a is more than the first input voltage 101a. In other words, the first input voltage 101a is up-converted 151a to the first output voltage 111a. The first output voltage 111a is supplied to the first output node 112a.

The charge pumping device 104 is further configured to convert a second input voltage 101b supplied to the second input node 102b down 151b (that is, by down-conversation 151b) to a second output voltage 111b (also referred as to OUT(−ve)). That is, the second output voltage 111b is less than the second input voltage 101b. In other words, the second input voltage 101b is down-converted 151b to the second output voltage 111b. The second output voltage 111b is supplied to the second output node 112b.

The converter circuit 100 includes further a control circuit 106 (also referred as to controller) configured to control the voltage applied to the first input node 102a and to the second input node 102b, e.g., in accordance with an operation mode of the converter circuit 100. The operation mode may be switched between a first operation mode (illustratively also referred as to up-conversation mode or positive operation mode) or a second operation mode (illustratively also referred as to down-conversation mode or negative operation mode).

The control circuit may be configured, if the operation mode is the first operation mode, to set the second input node 102b floating and supply the first input voltage 101a to the first input node 102a, such that the first output voltage 111a is output to the first output node 112a.

The control circuit may be configured, if the operation mode is the second operation mode, to set the first input node 102a floating and supply the second input voltage 101b to the second input node 102b, such that the second output voltage 111b is output at the second output node 112b.

According to various aspects, the operation mode may be represented by a voltage of an operation mode node 108 of the voltage converter circuit 100. In other words, the voltage (also referred as to operation mode voltage) at the operation mode node 108 may be indicative of whether the operation mode is the first operation mode or the second operation mode.

According to various aspects, the operation mode may be a function of the operation mode voltage or vice versa. For example, the operation mode voltage may be in a first voltage range (also referred as to first operation mode voltage) in the first operation mode and may be in a different second voltage range (also referred as to second operation mode voltage) in the second operation mode.

Generally, the operation mode voltage may be supplied to the voltage converter circuit 100 (e.g., from external, e.g., to the charge pumping device 104 or the control circuit 106) or may be generated by the voltage converter circuit 100. As example for the generation by the voltage converter circuit 100, the operation mode voltage may be generated by the control circuit 106, e.g., as function of the operation mode. As another example, the operation mode may be switched, e.g., by the control circuit 106, as function of an externally supplied operation mode voltage.

In an exemplarily implementation, the first operation mode voltage may be generated as a function of the first input voltage 101a or vice versa; and the second operation mode voltage may be generated as a function of the second input voltage 101b or vice versa. This facilitates the voltage converter circuit 100. Herein, reference will be made to such an exemplarily implementation of the operation mode node 108 (in this case, the operation mode voltage is also referred as to EN_POS_NEG), which is the first input voltage 101a in the first operation mode and the second input voltage 101b in the second operation mode. In other words, the exemplarily implementation provides that the first operation mode voltage is the first input voltage 101a and the second operation mode voltage is the second input voltage 101b. The references made to this exemplarily implementation may apply in analogy to other implementations of the voltage converter circuit 100, which provide or receive the operation mode voltage differently therefrom.

Figure 2:
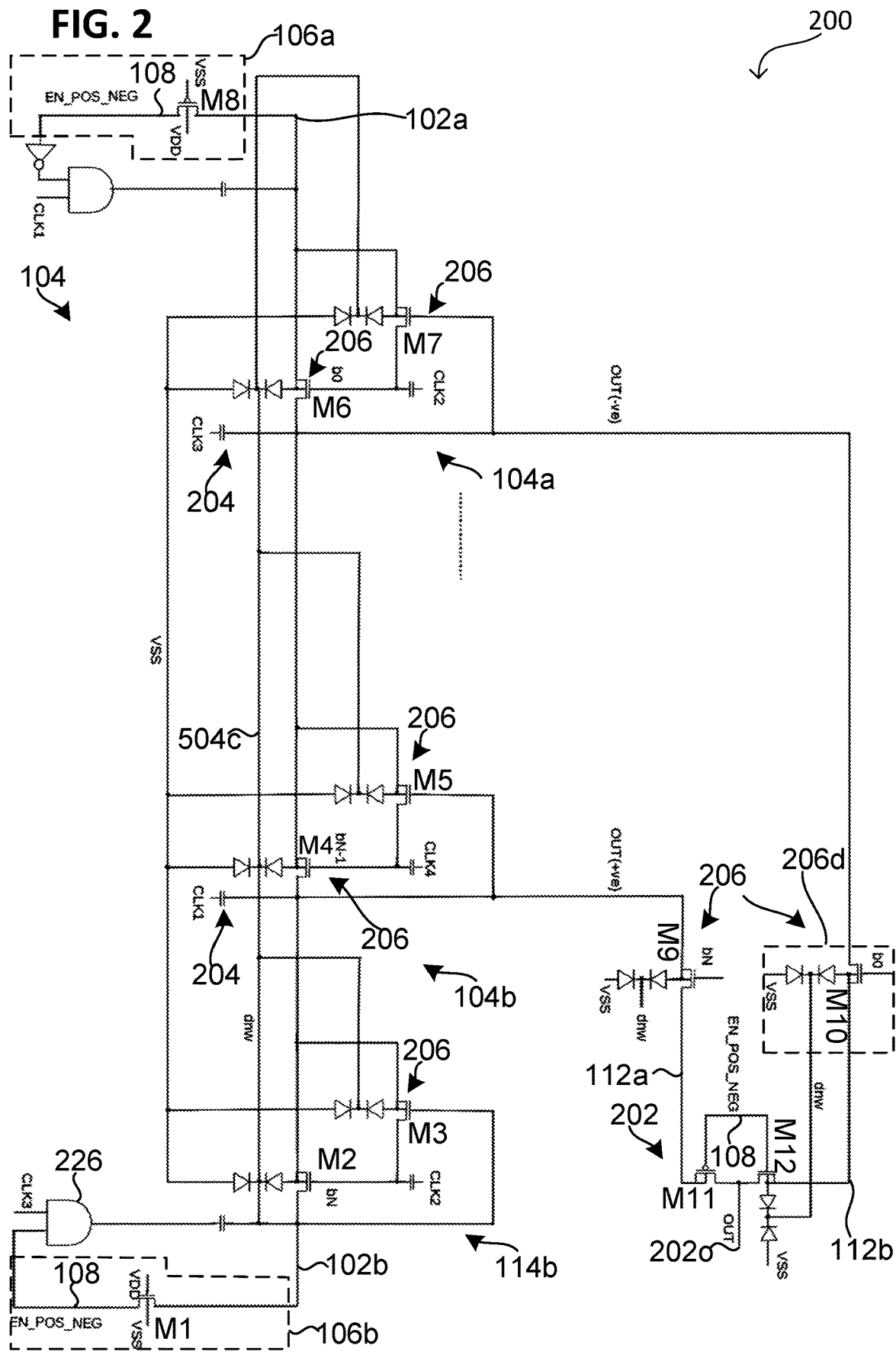

FIG. 2 illustrates a voltage converter circuit 100 according to various aspects 200 in a schematic circuit diagram (also referred as to exemplarily layout 1). As illustrated, the charge pumping device 104 may include two or more (e.g., N) serially connected charge pumps 104a, 104b, 114b, e.g., a first charge pump 104a, one or more second charge pumps 104b and an optionally third charge pump 114b.

The charge pumping device 104 may be of a bootstrap type as depicted. For example, the N charge pumps may each be a bootstrap type charge pump (also referred as to bootstrap charge pump). Generally, the charge pumping device 104, may also be of another type, e.g., a latch type (see, for example, FIG. 8). The references made herein to bootstrap charge pumps may be understood as example, and may, in analogy apply the other types of charge pumps, e.g., latch type charge pumps, and vice versa.

For a facilitated understanding, the charge pumps are numbered herein according to their position along to the serial connection of the charge pumps. Said more generally, references made to a #n charge pump indicate a charge pump having the n-th position within the N serially connected charge pumps, wherein $1 \leq n \leq N$. Analogously, references made to a #n pumping stage indicate a pumping stage including the #n charge pump. In the first operation mode, the #n pumping stage may have the order o=n. In the second operation mode, the #n pumping stage may have the order o=N+1−n.

For example, the first charge pump 104a may refer to the charge pump at position 1 (also referred as to #1 charge pump), e.g., being coupled closest to the first input node 102a and/or between the first input node 102a and the second output node 112b. Analogously, the third charge pump 114b may refer to the charge pump at position N (also referred as to #N charge pump), e.g., being closest to the second input node 102b and/or being coupled between the second input node 102b and the first output node 112a. Analogously, the one or more second charge pumps 104b may refer to the charge pump(s) at positions 2 to N−1, e.g., being coupled between the first output node 112a and the second output node 112b. Illustratively, the one or more second charge pumps 104b may be the intermediate charge pump(s). Among others, reference will be made to one second charge pump 104b as representative for each of the one or more intermediate charge pump(s) 104b.

Herein, the first charge pump 104a may be understood as exemplarily representative of a charge pump stage (also referred as to "stage" or pumping stage), each second charge pump 104b may be understood as exemplarily representative of a respective charge pump stage, and the third charge pump 114b may be understood as exemplarily representative of a charge pump stage. The references made herein to the specific charge pumps may apply analogously to respective stages, each of which may include one or more charge pumps or another type of charge pump(s).

In this context, it is noted that the operation direction of a charge pump or hierarchy of the stages may be a function of the operation mode. For example, input and output of a charge pump may be swapped by changing between the first and second operation mode. Thus, references made to the function or operation (e.g., the pumping stage order or pumping direction) of the charge pumps may depend on whether the operation mode is either the first operation mode or the second operation mode. For example, the hierarchical first pumping stage and the hierarchical last pumping stage may be swapped by changing between the first and second operation mode. However, the n-th position of the #n charge pump within the N serially connected charge pumps may be understood as referring to the structural configuration of the voltage converter circuit 100, and thus, being invariant regarding a change of the operation mode.

The voltage converter circuit 100 may further include an output control circuit 202. The output control circuit 202 may be coupled to the first output node 112a and the second output node 112b. The output control circuit 202 may include an output node 202o (also referred as to common output node or OUT) of the voltage converter circuit 100. The output control circuit 202 may be configured to connect common output node 202o either to the first output node 112a in the first operation mode or to the second output node 112b in the second operation mode. For example, the output control circuit 202 may include or be formed from an inverter. For example, the input of the inverter may be electrically connected to the operation mode node 108.

In an exemplarily implementation, the voltage at the output node 202o may be used as power supply voltage (also referred as to power supply) for another circuit, e.g., a memory cell circuit.

The control circuit 106 may include multiple switches controlled in accordance with the operation mode, e.g., switched by switching the operation mode. The switches may be implemented by transistors of various types. Analogously, each charge pump may include one or more switches controlled in accordance with a pumping sequence. The pumping sequence may be a function of the operation mode, e.g., being reversed by switching the operation mode.

For example, a first component 106a (e.g., including or formed from a switch) of the control circuit 106 may be coupled between the first input node 102a and the operation mode node 108. The first component 106a may be configured to, in the first operation mode, electrically connect the first input node 102a with the operation mode node 108; and, in the second operation mode, electrically separate (e.g., by galvanic isolation) the first input node 102a from the operation mode node 108, e.g., thereby providing for a floating first input node 102a in the second operation mode.

For example, a second component 106b (e.g., including or formed from a switch) of the control circuit 106 may be coupled between the second input node 102b and the operation mode node 108. The first component 106a may be configured to, in the second operation mode, electrically connect the second input node 102b to the operation mode node 108; and, in the first operation mode, electrically separate (e.g., by galvanic isolation) the second input node 102b from the operation mode node 108, e.g., thereby providing for a floating second input node 102b in the first operation mode.

Further, the voltage converter circuit 100 may include multiple control inputs, e.g., including a first control input CLK1, a second control input CLK2, a third control input CLK3, and/or a fourth control input CLK4. A respective control signal CLK (e.g., being a clock signal) may be applied to each of the control input(s) in accordance with the pumping sequence, as detailed later.

The first control input CLK1 and/or the third control input CLK3 (also referred as to pumping input) may be each electrically connected to a charge storage 204 of the charge pumping device 104. In general, each charge pump 104a, 104b of the charge pumping device 104 may include a charge storage 204 connected to one of the control inputs. A charge storage 204 may include a capacity, e.g., provided by one or more capacitors of the respective charge pump 104a, 104b. Altering the voltage at the control input causes charging and discharging the charge storage 204.

The second control input CLK2 and/or the fourth control input CLK4 (also referred as to switching clock) may be each (e.g., capacitively) coupled to one or more switches 206 (also referred as to charge transfer switches) of the charge pumping device 104 for operating the one or more charge transfer switches 206. Illustratively, the one or more charge transfer switches 206 provide the input of the charge pumps 104a, 104b (e.g., including a respective charge pump input node) and the output of the charge pumps 104a, 104b (e.g., including a respective charge pump output node). For example, the one or more charge transfer switches 206 may include a charge transfer switch M4 (e.g., provided by transistor M4), coupled between two charge storages 204, such that the two charge storages 204 can be coupled to each other and decoupled from each other by operating the charge transfer switch M4. Analogously, the one or more charge transfer switches 206 may include charge transfer switch M6, M10, M2, M9 (e.g., provided by transistors M6, M10, M2, M9), by which the charge storages 204 are coupled to the charge pump input and decoupled from the charge pump output (and vice versa). The one or more charge transfer switches 206 may optionally include one or more gate control switches M3, M7 (e.g., provided by transistors M7, M3) providing control of the electrical potential of the gates of the transistors, and thus, enhance their operation.

According to the number N of stages, the voltage converter circuit 100 may include N charge transfer switches M6, M4, M2 coupled in series between the first input node 102a and the second input node 102b. Each of the N charge transfer switches may be controlled (e.g., at their gate) by a respective switching voltage b0, . . . , bN altered by the control signal applied to each of the control inputs CLK2, CLK4 (e.g., by capacitively coupling).

The gates of transistors M2 and M9 may be electrically conductively connected to each other. This enables switching transistor M2 and transistor M9 on/off at the same time (also referred as to synchronized switching). For a synchronized switching of M2 and M9, the gates of transistor M2 and transistor M9 may be supplied with the N-th switching voltage (bN). Additionally, or alternatively, the gates of transistor M6 and transistor M10 may be electrically conductively connected to each other. This enables switching transistor M6 and transistor M10 on/off at the same time. For synchronized switching of M6 and M10, the gates of transistor M6 and transistor M10 may be supplied with a 0-th switching voltage (b0).

Figure 11:
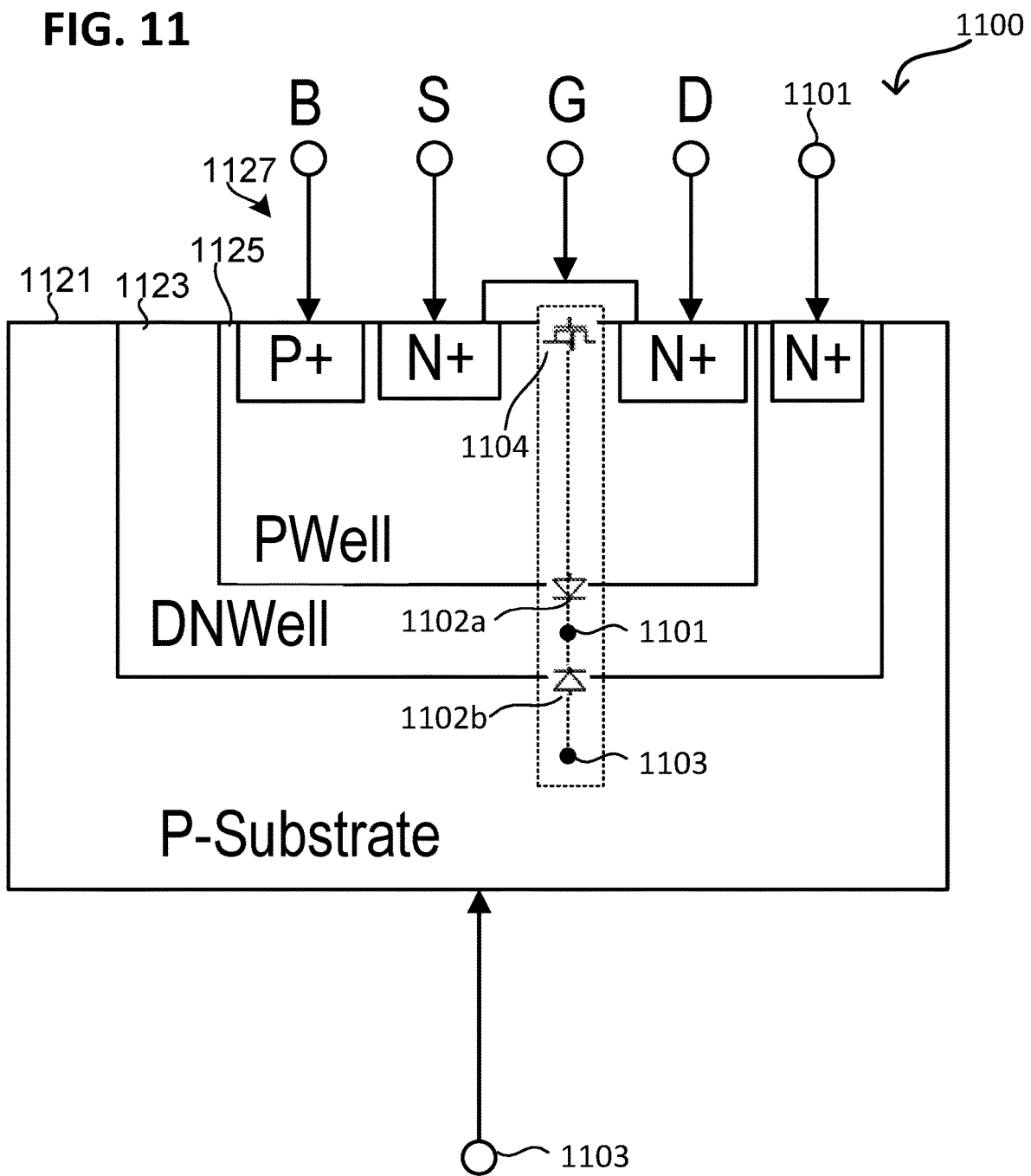
FIG. 11 shows a triple well device in a schematic layout diagram, according to various aspects.

One or more switches (e.g., each switch) of the voltage converter circuit 100 (e.g., of the charge transfer switches 206 and/or the inverter 202) may be provided by a triple well device, herein exemplarily represented by triple well transistor 206d (also referred as to dnw-transistor), e.g., a deep n-well transistor 206d as detailed further in FIG. 11. In the circuit diagrams, the dnw-transistor 206d is represented by two facing diodes and a FET. The references made to the dnw-transistor 206d may in analogy apply to other types of triple well devices (e.g., including a bipolar isolating well), not being necessarily limited to a deep n-well providing the bipolar isolating well.

The third charge pump 114b (also referred as to auxiliary charge pump) may be configured to generate an auxiliary voltage (indicated as "dnw"). The auxiliary voltage may be supplied to the intermediate well of the or each dnw-transistor 206d by an auxiliary circuit 504c. For example, the auxiliary circuit 504c may electrically connect (by dnw node) the second input node 102b to the intermediate well of one or more (e.g., each) dnw-transistor 206d of the voltage converter circuit 100. For example, the output of the third charge pump 114b (in the first operation mode) may be electrically connected to the intermediate well of one or more (e.g., each) triple well devices of the voltage converter circuit 100.

As example, the output of the third charge pump 114b is connected to all triple well transistors, which may be at a higher potential and approximately VSS in the positive operation mode and the negative operation mode, respectively.

Usage of the auxiliary charge pump 114b enables to provide the auxiliary voltage as function of the operation mode. For example, the auxiliary voltage, in the first operation mode, may be larger than VDD, e.g., larger than three times VDD (3·VDD), e.g., being substantially four times VDD.

Optionally, the auxiliary charge pump 114b may be coupled to the same control input CLK3 as the first charge pump 104a, e.g., via a an AND gate 226. This enables to enhance control of the auxiliary voltage.

As detailed herein, various implementations of the voltage converter circuit 100 may be used, e.g., according to the requirements. To generate a positive voltage and a negative voltage at the output node 202o, e.g., as power supply higher than VDD (measured in voltage magnitude), two or more charge pumps 104a, 104b may be used as depicted for the voltage converter circuit 100. Each of the two or more charge pumps 104a, 104b may be configured to generate either the negative voltage or the positive voltage as power supply with significant chip area reduction. Further, triple well devices (e.g., transistors) may be controlled properly in the two operating modes (positive and negative operation mode) in order to achieve the proper functionality.

In the positive operation mode (e.g., the first operation mode), transistor M8 is turned on and transistor M1 is turned off by setting the operation mode voltage to high (e.g., EN_POS_NEG=1). This causes the operation mode voltage (EN_POS_NEG) to be input to the first charge pump 104a. The voltage OUT(+ve) output by the charge pumping device 104 (illustratively, as result of the up-conversion) is provided to the output control circuit 202 by transistor M9, and to the common output node 202o by transistor M11. In the negative operation mode (e.g., the second operation mode), transistor M8 is turned off and transistor M1 is turned on by setting the operation mode voltage to low (e.g., EN_POS_NEG=0). This causes the operation mode voltage (EN_POS_NEG) to be input to the second charge pump 104b. The voltage OUT(−ve) output by the charge pumping device 104 (illustratively, as result of the down-conversion) is provided to the output control circuit 202 by transistor M10, and to the common output node 202o by transistor M12.

The exemplarily first implementation as depicted in FIG. 2, may allow that all transistors within the charge pumping device 104 stages are stressed (by voltage) to 2 times VDD. Additionally, or alternatively, the triple well diodes are stressed above 2 times VDD. However, other implementations may be provided to reduce the stress the circuit components.

An exemplarily second implementation (see, for example, FIG. 5) may allow that all transistors within the charge pumping device 104 are stressed to 2 times VDD in the positive operation mode. Stress on triple well diodes is significantly reduced. The triple well may be at a voltage in the range from 0 to $-V_{th}$ (of the bottom diode 1102b), which may be VSS.

An exemplarily third implementation (see, for example, FIG. 6 and FIG. 7) may allow that all transistors within the charge pumping device 104 are stressed to 2 times VDD in the positive operation mode (e.g., the first operation mode). The stress on triple well diodes is significantly reduced. The triple well may be at a voltage in the range from 0 to $-V_{th}$ (of the bottom diode 1102b), which may be VSS. The exemplarily third implementation may be used, if the level of the negative supply voltage is not required to be high.

Figure 3:
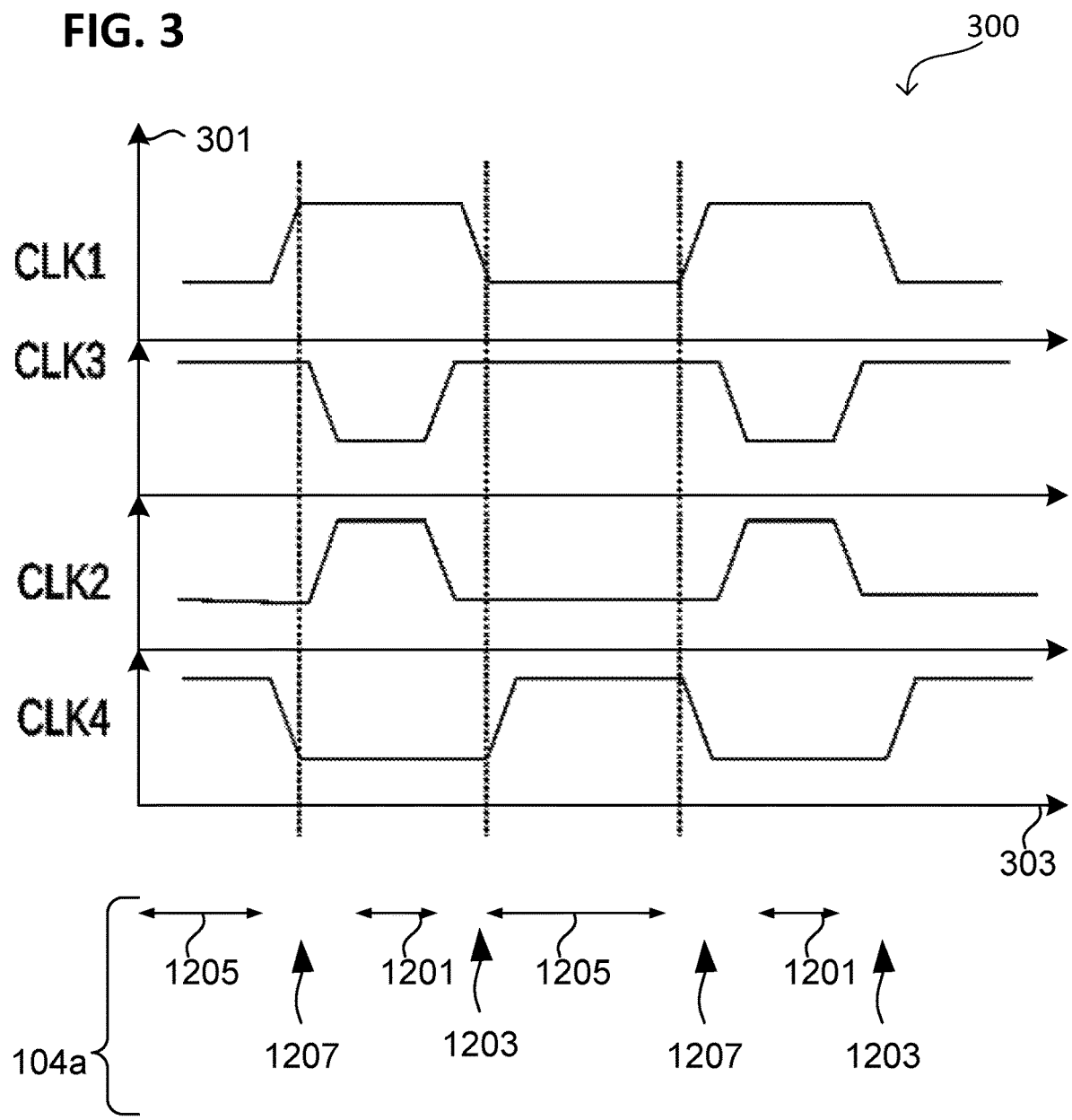
FIG. 3 shows voltages at multiple control inputs over time in a schematic voltage-over-time diagram, according to various aspects.

FIG. 3 illustrates voltages 301 at the multiple control inputs (CLK1 to CLK4) over time 303 for the charge pumping device 104 of the bootstrap type according to various aspects in a schematic voltage-over-time diagram 300, e.g., for the first operation mode. The voltages at the multiple control inputs may enable an appropriate operation of the charge pumping device 104, e.g., its one or more charge transfer switches and/or one or more charge storages. A first control signal is supplied to the control input CLK3 of the charge storage of a #1 charge pump, e.g., of the charge storage of each #(2k+1) charge pump (wherein k=0, 1, 2, . . . ). A second control signal is supplied to the control input CLK1 of the charge storage of a #2 charge pump, e.g., the charge storage of each #(2k) charge pump (wherein k=0, 1, 2, . . . ). The first and second control signals may be in push-pull configuration.

Analogously, auxiliary first and second control signals are supplied to control inputs CLK2 and CLK4 of the charge transfer switches. The auxiliary control signals supplied to adjacent charge pumps may be in push-pull configuration.

The first/second control signals and the auxiliary first/second control signals may be provided in accordance with the pumping sequence of the respective charge pump. Exemplarily phases 1201, 1203, 1205, 1207 of the pumping sequence 104a are detailed later (see, for example, FIG. 12).

Figure 4:
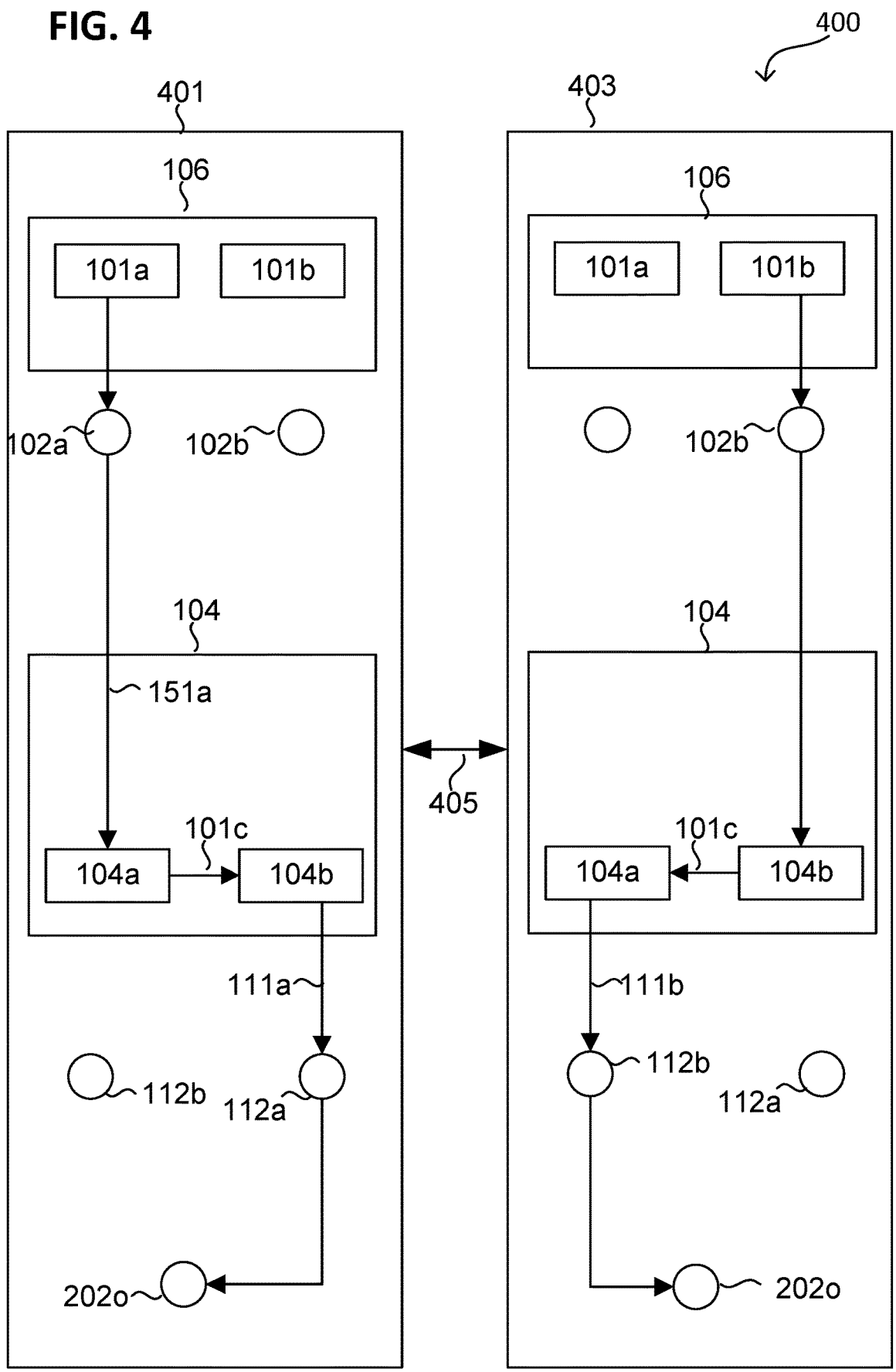
FIG. 4 shows a method for operating the voltage converter circuit, according to various aspects.

FIG. 4 illustrates a method 400 for operating the voltage converter circuit 100 according to various aspects in a flow diagram. The method 400 may include, in 401, operating the charge pumping device 104 in the first operation mode (e.g., in accordance with a first pumping sequence of the first operation mode); and, in 403, operating the charge pumping device 104 in the second operation mode (e.g., in accordance with a second pumping sequence of the second operation mode), and in 405, switching between the first operation mode and the second operation mode.

In the first operation mode, the first input voltage 101a may be supplied to the first charge pump 104a (providing a first up-conversion stage), thus being up-converted to an intermediate voltage 101c by the first charge pump 104a. The intermediate voltage 101c may be supplied to the second charge pump 104b, thus, being up-converted to the first output voltage 111a by the second charge pump 104b (providing as second up-conversion stage). The first output voltage 111a may be supplied to the first output node 112a and/or to the common output node 202o.

In the second operation mode, the second input voltage 101b may be supplied to the second charge pump 104b (providing a first down-conversion stage), thus, being down-converted to an intermediate voltage 101c by the second charge pump 104b. The intermediate voltage 101c may be supplied to the first charge pump 104a, thus, being down-converted to second output voltage 111b by the first charge pump 104a (providing a second down-conversion stage). The second output voltage 111b may be supplied to the second output node 112b and/or to the common output node 202o.

Herein, the first charge pump 104a may be understood as exemplarily representative of a first charge pump stage (also referred as to "stage") and the second charge pump 104b may be understood as exemplarily representative of a second charge pump stage. The references made herein to the specific charge pumps may apply analogously to respective stages, each of which including more than one charge pump or another type of charge pump.

The two stages 104a, 104b may be electrically connected to each other in series. This allows for swapping the stage order. The stage order represents, which of the stages is configured as input stage and which of the stages is configured as output stage. It may be understood that the references made herein to the two charge pumps may apply analogously to two or more than two stages, e.g., connected serially with each other.

Said more generally, switching between the first operation mode and the second operation mode includes swapping the stage order (e.g., between first-to-second stage and second-to-first stage) and/or stage type (between down-conversion stage and up-conversion stage) of charge pumping device 104. Swapping the stage order may include changing the direction of charge transfer provided by each of the stages.

Figure 5:
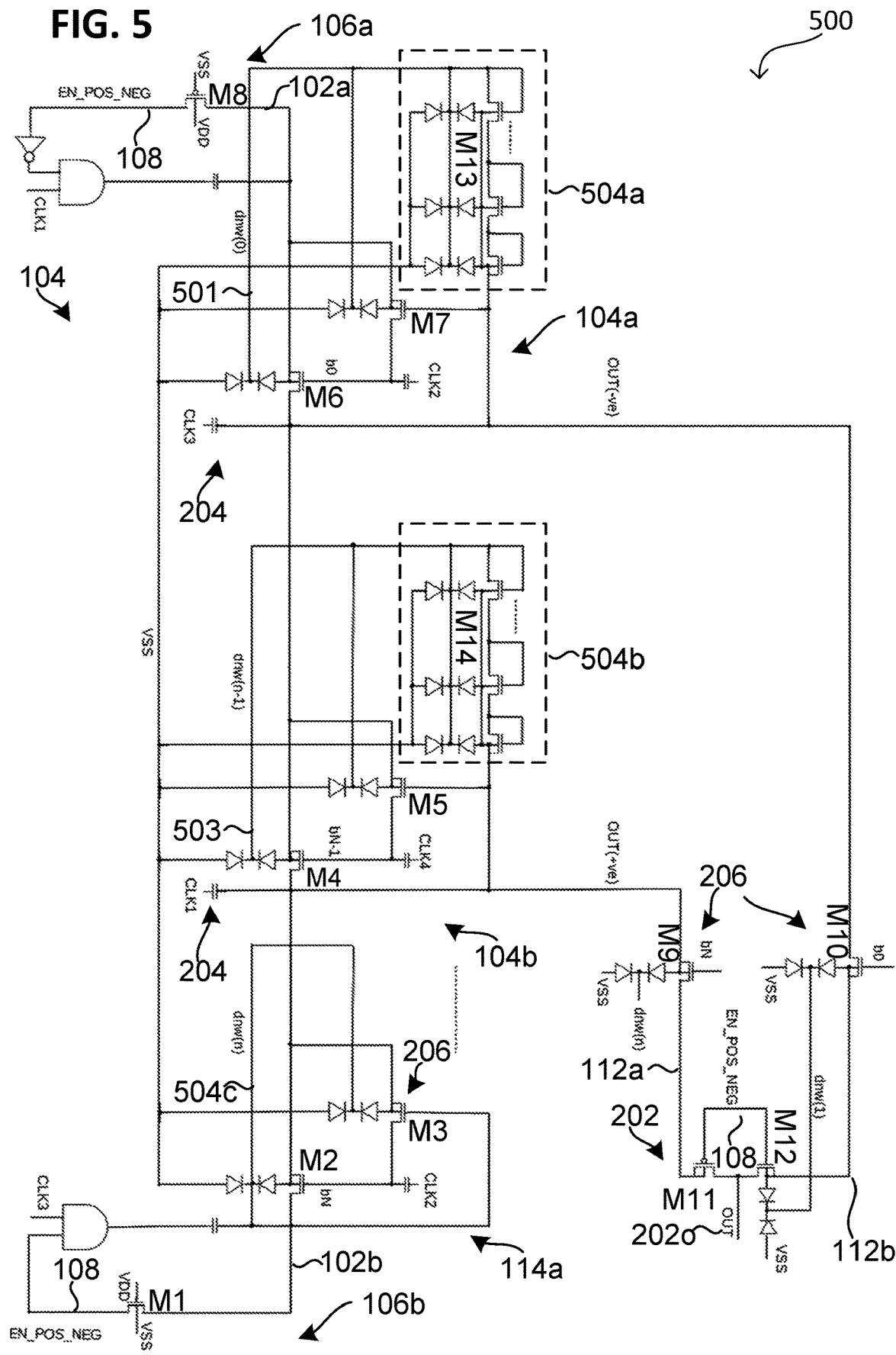
FIGS. 5 to 8 respectively show a voltage converter circuit in a schematic circuit diagram, according to various aspects.

FIG. 5 illustrates a voltage converter circuit 100 according to various aspects 500 in a schematic circuit diagram (also referred as to exemplarily layout 2). The voltage converter circuit 100 according to various aspects 500 includes one or more auxiliary circuits 504a, 504b, 504c for example, a first auxiliary circuit 504a, a second auxiliary circuit 504b and a third auxiliary circuit 504c. For example, each pump stage may each include one or more charge pumps and an auxiliary circuit associated with the one or more charge pumps. For a more detailed view of the first and second auxiliary circuits, see FIG. 9.

The first auxiliary circuit 504a may be coupled between the charge storage 204 of the first charge pump 104a and one or more bipolar isolating wells 501 of the first charge pump 104a (also referred as to first intermediate wells 501). The one or more first intermediate wells 501 may include the intermediate well of the charge transfer switch M6 of the first charge pump 104a and/or of the gate control switch M7 of the first charge pump 104a. The first auxiliary circuit 504a may be configured to provide a first auxiliary voltage dnw(0) to the one or more first intermediate wells 501 based on the voltage of the charge storage 204 of the first charge pump 104a.

The second auxiliary circuit 504b may be coupled between the charge storage 204 of the second charge pump 104b and one or more bipolar isolating wells 503 of the second charge pump 104b (also referred as to second intermediate wells 503). The one or more second intermediate well 503 may include the intermediate well of the charge transfer switch M4 of the second charge pump 104b and/or of the gate control switch M5 of the second charge pump 104b. The second auxiliary circuit 504b may be configured to provide a second auxiliary voltage dnw(1) to the one or more second intermediate wells 503 based on the voltage of the charge storage 204 of the second charge pump 104b.

The third auxiliary circuit (if present) may electrically connect (by dnw(n) node) the second input node 102b to the intermediate well of one or more (e.g., each) dnw-transistor 206d of the third charge pump 114b (if present).

The first and second auxiliary circuits 504a, 504b according to aspects 500 may include one or more triple well (also referred as to diode-connected) transistors M13, M14 (e.g., NMOS transistors), e.g., a plurality of diode-connected transistors M13, M14. For example, the auxiliary circuit 504a, 504b enables to keep the one or more intermediate wells of each stage at a voltage in the range between 0 to $-V_{th}$ (of bottom diode 1102b) in the second operation mode. In the first operation mode, the diode-connected transistors may be inactive (e.g., off) providing for the intermediate well of each stage being at higher voltage than the outer well of that stage and higher or equal voltage than the inner well of that stage. This archives that the intermediate well is well controlled, so the charge pump of each charge pump may be operated as down-converting (illustratively, negative voltage generating) charge pump in the second operation mode or as up-converting (illustratively, positive voltage generating) charge pump in the first operation mode. The two (illustratively, negative, and positive) operation modes may be triggered by the input signal EN_POS_NEG.

For activating the first operation mode, the transistor M8 is turned on and the transistor M1 is turned off by setting EN_POS_NEG=1, which triggers the charge pumping (transfer) from the first input node 102a towards the first output node 112a. The voltage OUT(+ve) as result of the charge pumping in the first operation mode (illustratively, the up-conversation or positive charge pumping) may be supplied to the common output node 202o via transistors M9 and M11. For activating the second operation mode, the transistor M1 is turned on and the transistor M8 is turned off by setting EN_POS_NEG=0, which triggers the charge pumping from the second input node 102b towards the second output node 112b. The voltage OUT(-ve) as result of the charge pumping in the second operation mode (illustratively, the down-conversation or negative charge pumping) may be supplied to the common output node 202o via transistors M10 and M12.

The number M of diode-connected transistors per auxiliary circuit 504a, 504b may be a function of the stage position, the auxiliary circuit 504a, 504b is part of. That is, the auxiliary circuit 504a, 504b of different pump stages may differ in their number M of diode-connected transistors.

As example, the number M of diode-connected transistors in the auxiliary circuit of the #n stage may $$M = \text{ceil}\left(\frac{N-n}{Vth} \cdot VDD\right)$$

or said differently $$M = \text{ceil}\left(\frac{o-1}{Vth} \cdot VDD\right),$$

wherein o=N+1−n is the order of the #n stage in the second operation mode.

The operator "ceil" denotes the floor function, that is the function that converts a numeral input (e.g., a real number) into an integer as output, which is the least integer greater than or equal to the input of the numeral input. Said otherwise, the ceil(x) is the integer in the interval [x, x+1). For example, the number M of diode-connected transistors of the auxiliary circuit 504a of the #1 stage (e.g., including the first charge pump) may be $$M = \text{ceil}\left(\frac{N-1}{Vth} \cdot VDD\right).$$

For example, the number M of diode-connected transistors of the auxiliary circuit 504a of the #N stage (e.g., including the third charge pump) may be M=0.

Figure 6:
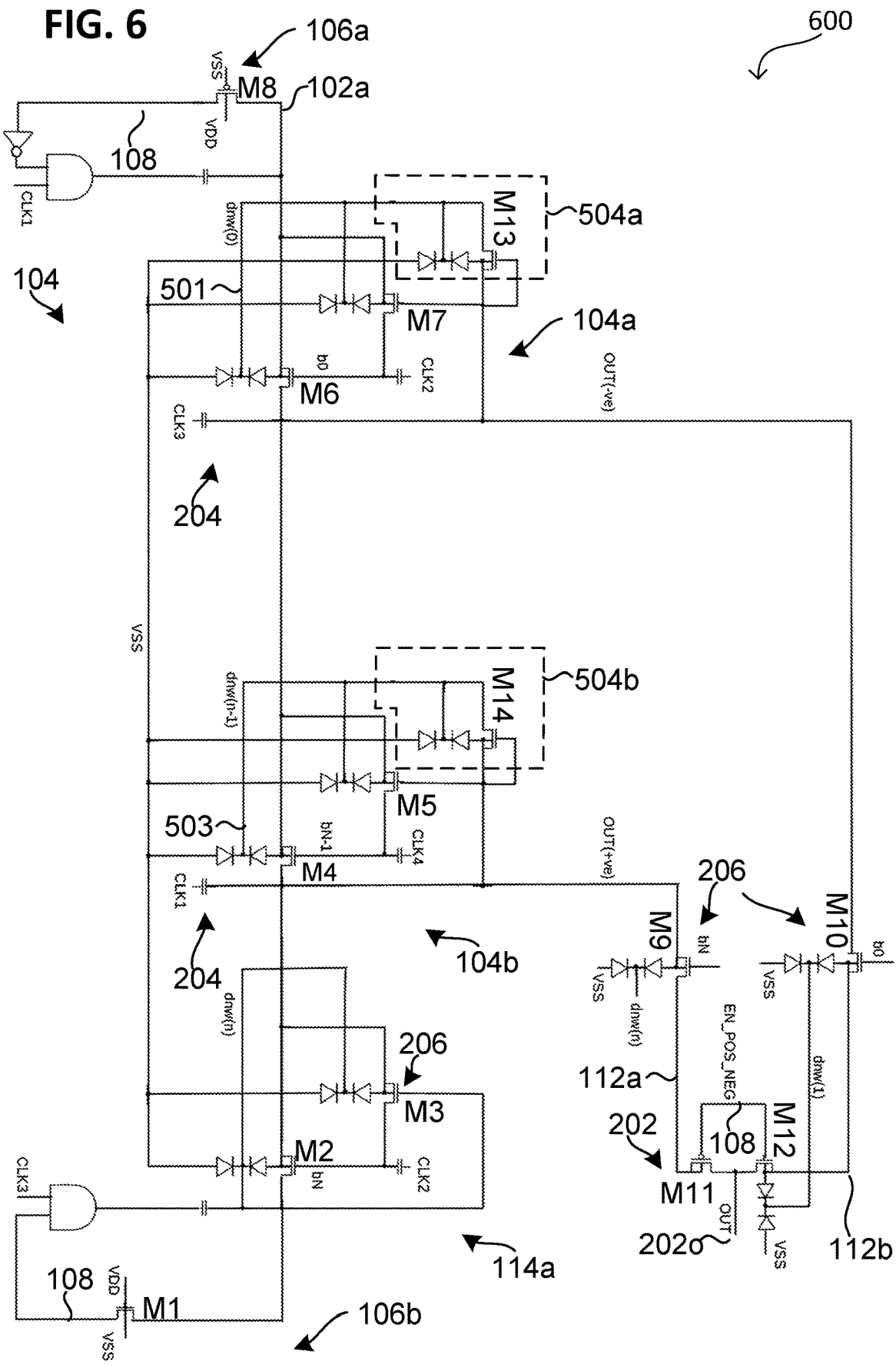

FIG. 6 illustrates a voltage converter circuit 100 according to various aspects in a schematic circuit diagram (also referred as to exemplarily layout 3). The voltage converter circuit 100 according to various aspects 600 includes one or more auxiliary circuits 504a, 504b, for example, the first auxiliary circuit 504a and the second auxiliary circuit 504b.

Each auxiliary circuit 504a, 504b according to aspects 600 includes one diode-connected transistor M13, M14

(e.g., NMOS transistor). For example, the auxiliary circuit 504a, 504b enables to keep the intermediate well of each stage at a voltage higher than the voltage of the outer well 1121 in the first operation mode. In the second operation mode, the one diode-connected transistor may be deactivated (e.g., off) providing for the intermediate well of each stage to be at a voltage above $-V_{th}$ (of the bottom diode 1102b), which may draw a small current through the bottom diode 1102b. This archives that the intermediate well is well controlled, so that the charge pump can be operated as down-converting charge pump in the second operation mode and as up-converting charge pump in the first operation mode. The two (illustratively, negative and positive) operation modes may be selected by an input signal EN_POS_NEG.

For activating the first operation mode, the transistor M8 is turned on and the transistor M1 is turned off by setting EN_POS_NEG=1, which triggers the charge pumping from the first input node 102a towards the first output node 112a. The voltage OUT(+ve) as result of the charge pumping in the first operation mode (illustratively, the up-conversation or positive charge pumping) may be supplied to the common output node 202o via transistors M9 and M11. For activating the second operation mode, the transistor M1 is turned on and the transistor M8 is turned off by setting EN_POS_NEG=0, which triggers the charge pumping from the second input node 102b towards the second output node 112b. The voltage OUT(-ve) as result of the charge pumping in the second operation mode (illustratively, the down-conversation or negative charge pumping) may be supplied to the common output node 202o via transistors M10 and M12.

Figure 7:
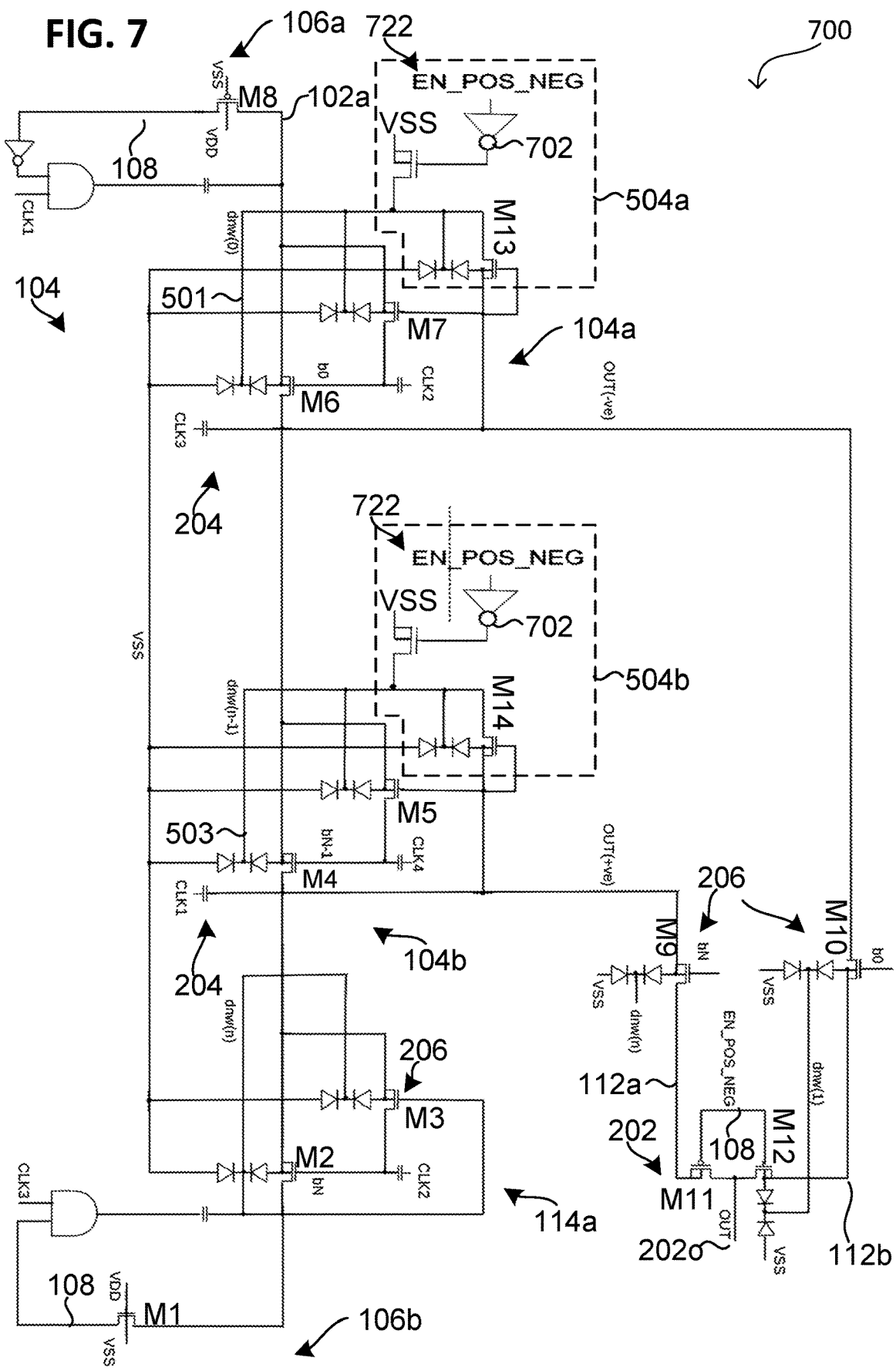

FIG. 7 illustrates a voltage converter circuit 100 according to various aspects 700 in a schematic circuit diagram (also referred as to exemplarily layout 4). The voltage converter circuit 100 according to various aspects 700 includes one or more auxiliary circuits 504a, 504b, for example, the first auxiliary circuit 504a and the second auxiliary circuit 504b.

Each auxiliary circuit 504a, 504b according to aspects 700 includes the one or more diode-connected transistor M13, M14 (e.g., NMOS transistors), e.g., the plurality of diode-connected transistors M13, M14, and an auxiliary voltage supply 722. The auxiliary voltage supply 722 may include one or more inverters 702 and a switch (also referred as to auxiliary voltage switch). The auxiliary voltage switch is coupled between VSS and the respective intermediate well 501, 503. The inverter 702 inverts EN_POS_NEG and applies the invert of EN_POS_NEG as switch voltage to the auxiliary voltage switch.

This achieves that VSS is supplied to the intermediate well 501, 503 (instead of a voltage between 0 to $-V_{th}$) in the second operation mode. It is noted that the one or more diode-connected transistor M13, M14 is under a higher stress in the second operation mode. Generalizing the above, one or more charge pumps are provided to generate a positive or negative power supply. Each triple well device is well controlled, e.g., by one or more auxiliary circuits 504a, 504b. The devices of the voltage converter circuit 100 are stressed by a voltage below or equal to two times VDD (see, for example, aspects 200 and 500). The well diode stress is significantly reduced (see, for example, aspects 200).

Figure 8:
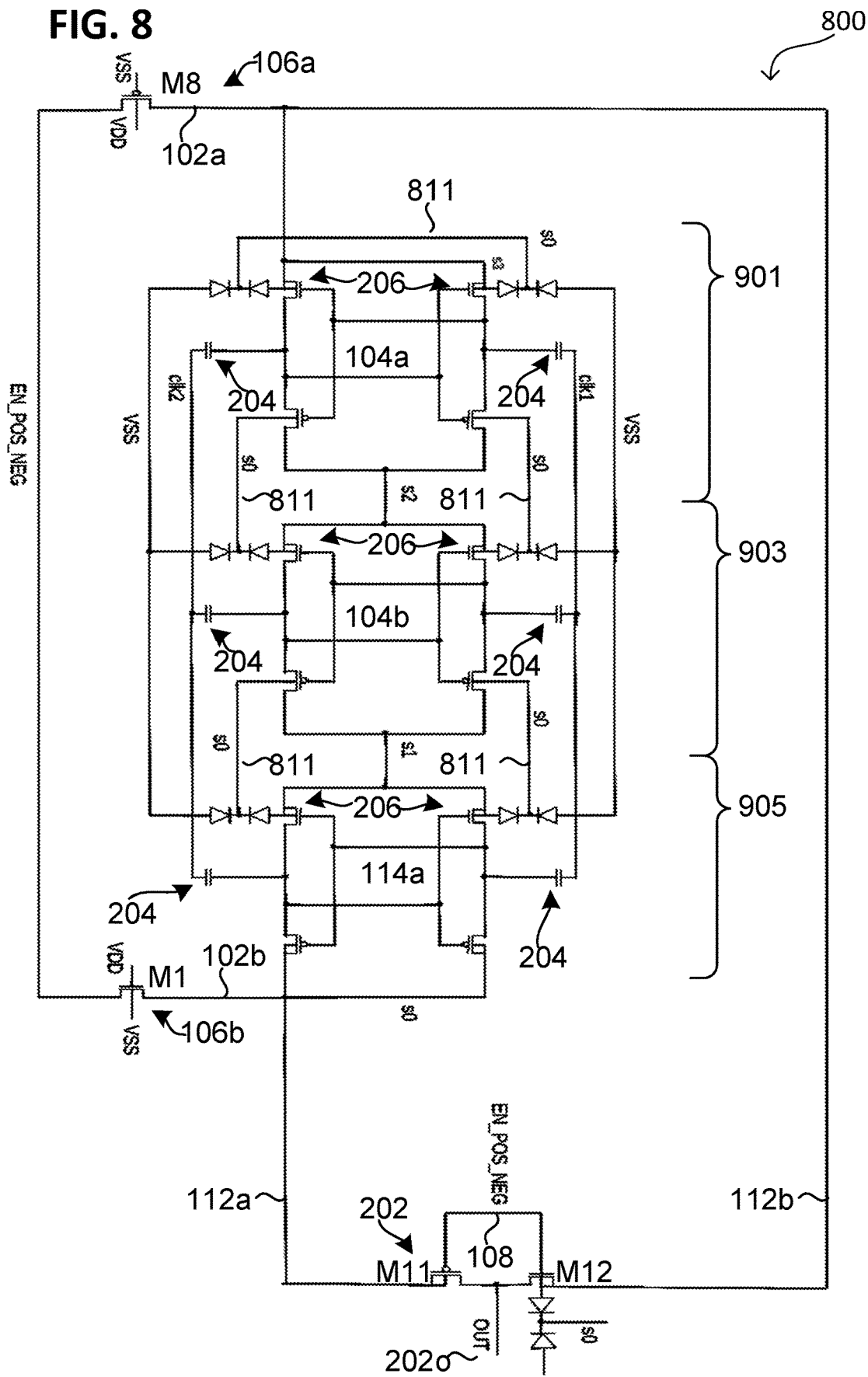

FIG. 8 illustrates a voltage converter circuit 100 according to various aspects 800 in a schematic circuit diagram (also referred as to exemplarily layout 5). The voltage converter circuit 100 may include one or more charge pumps, each of which is part of a pump stage 901, 903, 905. For example, a first pump stage 901 may include a first charge pump 104a, a second pump stage 903 may include a second charge pump 104b, and a third pump stage 905 may include a third charge pump 114a. It may be understood that the number of pump stages 901, 903, 905 may be more than three or less than three, e.g., one or two.

Each pump stage 901, 903, 905 may further include an auxiliary circuit. As illustrated, each auxiliary circuit may electrically connect (by node s0) the first output node 112a to one or more (e.g., each) intermediate wells of the respective stage (e.g., its triple well switches 206). For example, the auxiliary circuit may be configured to set the voltage of the output node s0 to substantially VSS in the first operation mode and the second operation mode.

For activating the first operation mode, the transistor M8 is turned on and the transistor M1 is turned off by setting EN_POS_NEG=1, which triggers the charge pumping from the first input node 102a towards the first output node 112a. The voltage OUT(+ve) as result of the charge pumping in the first operation mode (illustratively, the up-conversation or positive charge pumping) may be supplied to the common output node 202o via transistor M11. Thus, in the first operation mode, the first pump stage 901 may be of order 1, the second pump stage 903 may be of order 2, and the third pump stage 905 may be of order 3.

For activating the second operation mode, the transistor M1 is turned on and the transistor M8 is turned off by setting EN_POS_NEG=0, which triggers the charge pumping from the second input node 102b to the second output node 112b. The voltage OUT(-ve) as result of the charge pumping in the second operation mode (illustratively, the down-conversation or negative charge pumping) may be supplied to the common output node 202o via transistors M12. In the second operation mode, the first pump stage 901 may be of order 3, the second pump stage 903 may be of order 2, and the third pump stage 905 may be of order 1.

By the voltage converter circuit 100 according to various aspects 800 one or more charge pumps may provide for both, generating a positive power supply and generating a negative power supply. The triple well devices are well controlled.

Voltage converter circuit 100 according to various aspects 800 provides for a reduced complexity. As visible, less control signals are used. A control signal may be applied to each of the control input(s) CLK1 and CLK2 as detailed below.

Figure 9:
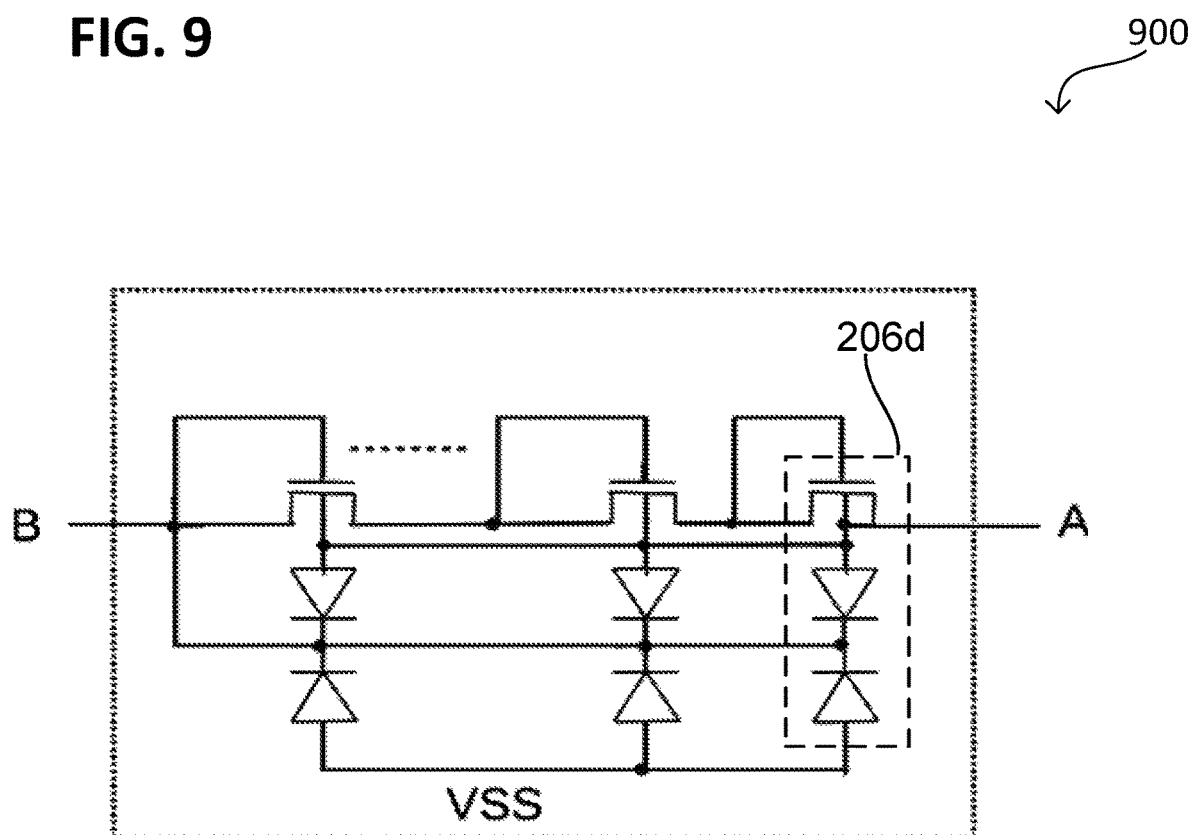
FIG. 9 shows an auxiliary circuit in a schematic circuit diagram, according to various aspects.

FIG. 9 illustrates an auxiliary circuit according to various aspects 900 in a schematic circuit diagram, the auxiliary circuit including one or more diode-connected transistors 206d, e.g., multiple diode-connected transistors 206d in series connection.

The auxiliary circuit according to various aspects 900 may be used in exemplarily layout 2 (see, for example, FIG. 5). In this case, the input node A of an auxiliary circuit of a stage may be connected to the charge storage the charge pump of the stage. The output node B of the auxiliary circuit may be connected to one or more intermediate wells of the stage.

Additionally, or alternatively, auxiliary circuit according to various aspects 900 may be used as alternative to the node s0 of exemplarily layout 5. In this case (also referred as to exemplarily layout 6), the input node A of the auxiliary circuit of a stage (e.g., stage 901 and/or stage 903) may be connected to the output node s1, s2 of the charge pump of the stage. The output node B of the auxiliary circuit may be connected to one or more intermediate wells 811 of the stage.

As detailed above, the number M of diode-connected transistors 206d per auxiliary circuit 504a, 504b may be a function of the order of the pump stage in the second operation mode. That is, the auxiliary circuits 504a, 504b of different pump stages may differ in their number M of diode-connected transistors. As example, the number M of diode-connected transistors may be $$M = \text{ceil}\left(\frac{N-n}{Vth} \cdot VDD\right)$$

or said differently $$M = \text{ceil}\left(\frac{o-1}{Vth} \cdot VDD\right),$$

wherein o=N+1−n is the order of the #n stage in the second operation mode.

For example, the number M of diode-connected transistors 206d of the auxiliary circuit of pump stage 901 may be $$M = \text{ceil}\left(\frac{2}{Vth} \cdot VDD\right).$$

For example, the number M of diode-connected transistors of the auxiliary circuit of pump stage 903 may be $$M = \text{ceil}\left(\frac{VDD}{Vth}\right)\}.$$

For example, the number M of diode-connected transistors of the auxiliary circuit of the pump stage 905 may be M=0.

As outlined above, the auxiliary circuit of aspects 900 may be similar to the first and second auxiliary circuits 504a, 504b of exemplarily layout 2. It may be understood that the auxiliary circuits of exemplarily layout 3 or exemplarily layout 4 may also be used in exemplarily layout 6, e.g., alternatively to the auxiliary circuit of exemplarily layout 2.

Figure 10:
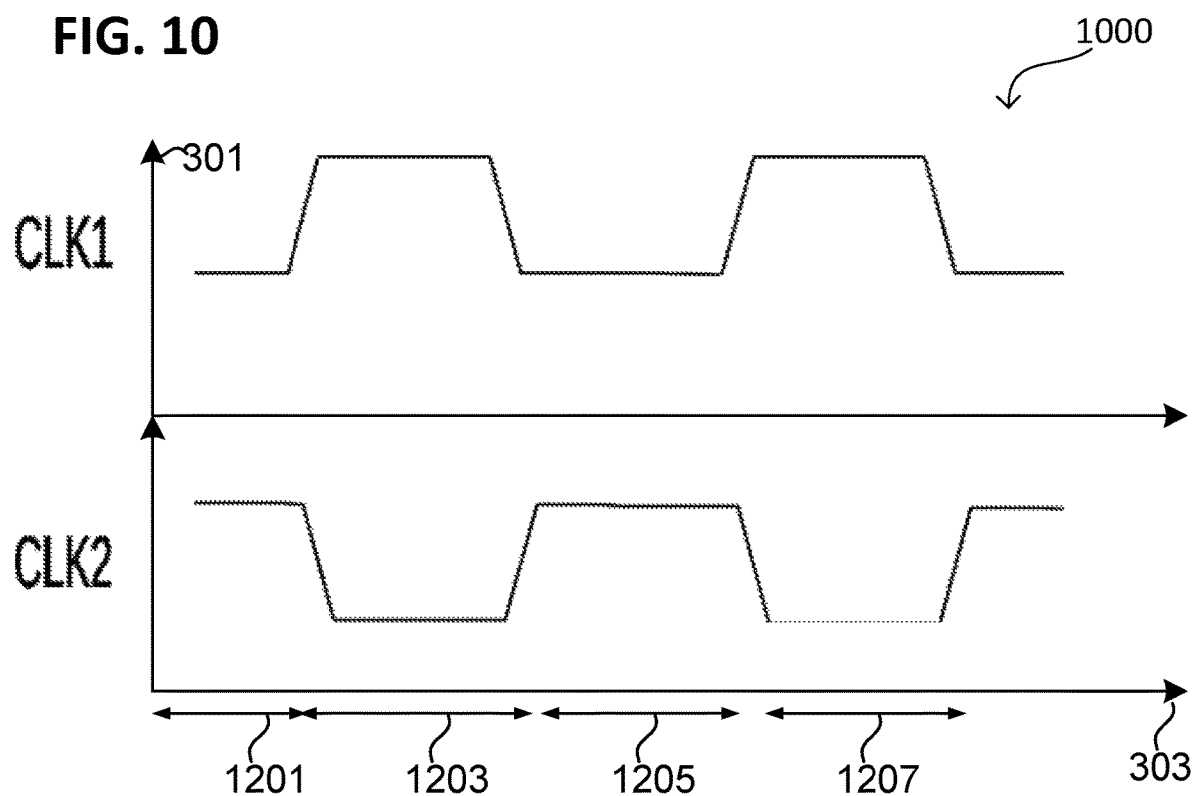
FIG. 10 shows voltages at multiple control inputs over time in a schematic voltage-over-time diagram, according to various aspects.

FIG. 10 illustrates voltages 301 at multiple control inputs (CLK1 and CLK2) over time 303 for the charge pumping device 104 of the latch type as detailed herein according to various aspects in a schematic voltage-over-time diagram 1000, e.g., for the first operation mode. The voltages at the multiple control inputs may enable an appropriate operation of the charge pumping device 104, e.g., its one or more charge storages. For example, each charge pump of the latch type may include a first charge storage (e.g., provided by one or more first capacitors) and a second charge storage (e.g., provided by one or more second capacitors), wherein a first control signal is coupled to the control input CLK1 of the first charge storage and a second control signal is coupled to the control input CLK2 of the first charge storage. The first and second control signal may be in push-pull configuration.

FIG. 11 illustrates a dnw-transistor as exemplarily representative of a triple well device 1100 (also referred as to device in triple well configuration) according to various aspects in a schematic layout diagram. The triple well device 1100 may include multiple wells, including, for example, an outer well 1121 (e.g., provided by a substrate), an intermediate well 1123 (also referred as to first well or bipolar isolating well) embedded in the outer well, and an inner well 1125 (also referred as to second well) embedded in the intermediate well 1123. The triple well device 1100 may further include a semiconductor device 1127 embedded in the inner well 1125, e.g., a FET 1127 embedded in the inner well 1125. Via the semiconducting junctions formed by the intermediate well 1123, the outer well 1121 (e.g., bulk-well) and the inner well 1125 are isolated from each other, which is also referred as to bipolar isolation. In other words, the intermediate well 1123 is a bipolar isolating semiconductor well 1123.

The semiconductor device 1127 may include at least two terminals and one or more semiconductor junctions connecting the at least two terminals with each other. The multiple wells may include or be formed from a doped semiconductor material, e.g., doped silicon. The doping type of the intermediate well 1123 (e.g., n-type) may of the opposite to the doping type of the outer well 1121 and inner well 1125 (e.g., p-type). In the circuit diagrams, the triple well configuration is represented by two diodes 1102a, 1102b, each of which representing the interface between two wells, in which the semiconductor device 1127 is embedded. The diode 1102b formed by the interface of the outer well and the inner well is herein referred as to bottom diode 1102b having a threshold $V_{th}$.

In the following, the more specific dnw-transistor is outlined as an example for a triple well transistor. The references made to the dnw-transistor may in analogy apply to other types of triple well devices 1100.

The dnw-transistor includes a p-substrate (p doped substrate) as outer well 1121, a deep n-doped well as intermediate well 1123, and p-doped well as inner well 1125. The semiconductor device 1127 may include a field-effect transistor 1104 (FET) embedded in the inner well 1125. The semiconductor device 1127 may be a n-channel FET (also referred as to NMOS transistor) as example. The terminals of the FET 1127 are: base (B), source (S), drain (D) and gate (G).

The intermediate well 1123 may be contacted by an intermediate well terminal 1101, e.g., for applying an auxiliary voltage (indicated as dnw) to the intermediate well 1123 via intermediate well terminal 1101. The outer well 1121 may be contacted by an outer well terminal 1103, e.g., for applying a base voltage (e.g., VSS) to the outer well 1121 via outer well terminal 1103. The inner well 1125 may be contacted by an inner well terminal B (here the base), e.g., for applying a further base voltage to the inner well 1125 via inner well terminal B.

In the following, various examples are provided for implementing various aspects, which are described herein for charge pump(s) of the bootstrap type and for charge pump(s) of the latch type.

In the following, reference is made to the voltage converter circuit 100 as detailed herein in order to outline one or more general aspects. As indicated above, the auxiliary voltage (also referred as to bias voltages) applied to the intermediate well (also referred as to first well) of one or more triple well devices of the charge pump may be an important parameter for their proper operation.

According to various aspects, the auxiliary voltage supplied to one or more intermediate wells of the charge pump may be a function of the operation mode and/or a function of the position of the charge pump.

The auxiliary voltage in the second operation mode may be substantially VSS (e.g., in the range between VSS−$V_{th}$ to VSS). The auxiliary voltage in the first operation mode may be more than the auxiliary voltage in the second operation and/or more than VDD. This increases the efficiency of the charge pumping. For example, losses into the substrate may be reduced.

The voltage converter circuit may include one or more (e.g., N) charge pumps. At least one charge pump (also referred as to equally biased charge pump) of the one or more (e.g., N) charge pumps, includes a set of triple well transistors, wherein the intermediate well of each of the triple well transistors is electrically conductively connected to the second input node. In various implementations (also referred as to individual biasing implementations), the at least one charge pump may include less than the one or more (e.g., N) charge pumps, e.g., only include the #N charge pump (see for example, exemplarily layouts 2, 3, 4 and 6). In various other implementations (also referred as to equally biasing implementations), the at least one charge pumps may include each of the one or more (e.g., N) charge pumps, e.g., the #1 charge pump to the #N charge pump (see for example, exemplarily layouts 1 and 5).

In the various individual biasing implementations, the voltage converter circuit may include one or more pairs of auxiliary circuit and charge pump (also referred as to individually biased charge pump). Each individually biased charge pump of a pair may include a set of triple well transistors, wherein the intermediate well of each of the triple well transistors is electrically conductively connected to the auxiliary circuit of the pair (see for example, exemplarily layouts 2, 3, 4 and 6). The auxiliary circuit may be configured to supply the auxiliary voltage to the intermediate well of each of the triple well transistors. For example, the auxiliary voltage may be a function of the operation mode. In the second operation mode, the auxiliary voltage may be substantially VSS (e.g., in the range between VSS–$V_{th}$ to VSS, wherein $V_{th}$ is the threshold voltage of the transistors of the auxiliary circuit). In the first operation mode, the auxiliary voltage may be in the range between 110% and 210% of the input voltage of the charge pump.

The following exemplarily values for the auxiliary voltage in the first operation mode are provided, e.g., for exemplarily layouts 2, 3, 4. The auxiliary voltage in the first operation mode for the #1 charge pump may be $2 \cdot VDD - V_{th}$. The auxiliary voltage in the first operation mode for the #2 charge pump may be $3 \cdot VDD - V_{th}$. Said more generally, the auxiliary voltage in the first operation mode for the #n charge pump may be $(n+1) \cdot VDD - V_{th}$. Thus, the auxiliary voltage in the first operation mode for the #N charge pump may be $(N+1) \cdot VDD - V_{th}$.

The following exemplarily values for the auxiliary voltage in the second operation mode are provided. For the exemplarily layout 2, the auxiliary voltage in the second operation mode provided for the #n charge pump may be $-n \cdot VDD + N - V_{th}$ (e.g., to be close to VSS). For the exemplarily layout 3, the auxiliary voltage in the second operation mode provided for the #n charge pump may in the range between floating 0 and $-V_{th}$. For the exemplarily layout 4, the auxiliary voltage in the second operation mode provided for the #n charge pump may be VSS (e.g., actively supplied). Examples of the auxiliary voltage in the second operation mode for exemplarily layout 5 may be similar thereto, e.g., depending on the type of auxiliary circuit used (see, e.g., exemplarily layout 6).

By example, all first wells of the voltage converter circuit 100 may be biased reversed in the first operation mode to avoid a charge transfer into the substrate.

Referring to exemplarily layout 2, the triple well transistor(s) of the auxiliary circuit (e.g., connected to the output node of the first charge pump) may each include a threshold voltage $V_{th}$. In the first operation mode, the triple well transistor(s) may be switch off and the auxiliary voltage is provided to be about the output voltage (e.g., being $2 \cdot VDD$) of the first charge pump minus $V_{th}$. In the second operation mode, the triple well transistor(s) may be switch on successively and the auxiliary voltage is provided to be about the input voltage ($-(N-1) \cdot VDD$) of the first charge pump minus M times $V_{th}$, wherein M is the number of triple well transistor(s) within the auxiliary circuit. M may be selected such that the auxiliary voltage is substantially (e.g., close to) VSS or 0 Volt.

Referring to exemplarily layout 3, the triple well transistor(s) of the auxiliary circuit may each include a threshold voltage $V_{th}$. In the first operation mode, the triple well transistor(s) may be switched on and the auxiliary voltage is provided to be substantially the output voltage (e.g., being $2 \cdot VDD$) of the first charge pump minus $V_{th}$. In the second operation mode, the triple well transistor(s) may be switch off and the first well of each triple well transistor(s) may be floating and may therefore stay at substantially VSS or 0 Volt. The voltage of the first well may drop to or by $-V_{th}$ but not further.

Referring to exemplarily layout 4, the triple well transistor(s) of the auxiliary circuit may each include a threshold voltage $V_{th}$. In the first operation mode, the triple well transistor(s) may be switched on and the auxiliary voltage is provided to be about the output voltage (e.g., being $2 \cdot VDD$) of the first charge pump minus $V_{th}$. The auxiliary voltage supply may be switched off. In the second operation mode, the triple well transistor(s) may be off and the first well of each triple well transistor(s) is supplied with VSS or 0V via the auxiliary voltage supply that is on.

Referring to exemplarily layout 2, each triple well transistor of the auxiliary circuit associated with the #n charge pump may include a threshold voltage $V_{th}$. In the first operation mode, the triple well transistor(s) of the auxiliary circuit (e.g., connected to the output node of the first charge pump) may be switched off and the auxiliary voltage is provided to be about the output voltage ($2 \cdot VDD$ or $3 \cdot VDD$) of the first charge pump minus $V_{th}$. In the second operation mode, the triple well transistor(s) of the auxiliary circuit may be switch on successively and the auxiliary voltage is provided to be about the input voltage ($-(n-1) \cdot VDD$ or $-(M-2) \cdot VDD$) of the #n charge pump minus $M \cdot V_{th}$, wherein M is the number of triple well transistor(s) within the auxiliary circuit. M is selected such that the auxiliary voltage is close to VSS or 0 V.

Referring to exemplarily layout 3, each triple well transistor of the auxiliary circuit associated with the #n charge pump may include a threshold voltage $V_{th}$. In the first operation mode, the triple well transistor(s) of the auxiliary circuit may be switched on and the auxiliary voltage is provided to be about the output voltage ($2 \cdot VDD$ or $3 \cdot VDD$) of the first charge pump minus $V_{th}$. In the second operation mode, the triple well transistor(s) of the auxiliary circuit may be switched off and the first well of each of the triple well transistor(s) of the auxiliary circuit is floating and may be therefore at substantially at VSS or 0V. The voltage at the first well may drop to or by $-V_{th}$ but not further.

Referring to exemplarily layout 4, the auxiliary circuit may supply a base voltage (VSS or 0 Volts) as auxiliary voltage.

Referring to exemplarily layout 4, each triple well transistor of the auxiliary circuit associated with the #n charge pump may include a threshold voltage $V_{th}$. In the first operation mode, the triple well transistor(s) of the auxiliary circuit may be switched on and the auxiliary voltage is provided to be about the output voltage (2·VDD) of the first charge pump minus $V_{th}$. In other words, the auxiliary voltage supply is off in the first operation mode. In the second operation mode, the triple well transistor(s) of the auxiliary circuit may be switched off and the first well of each of the triple well transistor(s) is supplied with VSS or 0V via the auxiliary voltage supply that is switched on.

Figure 12:
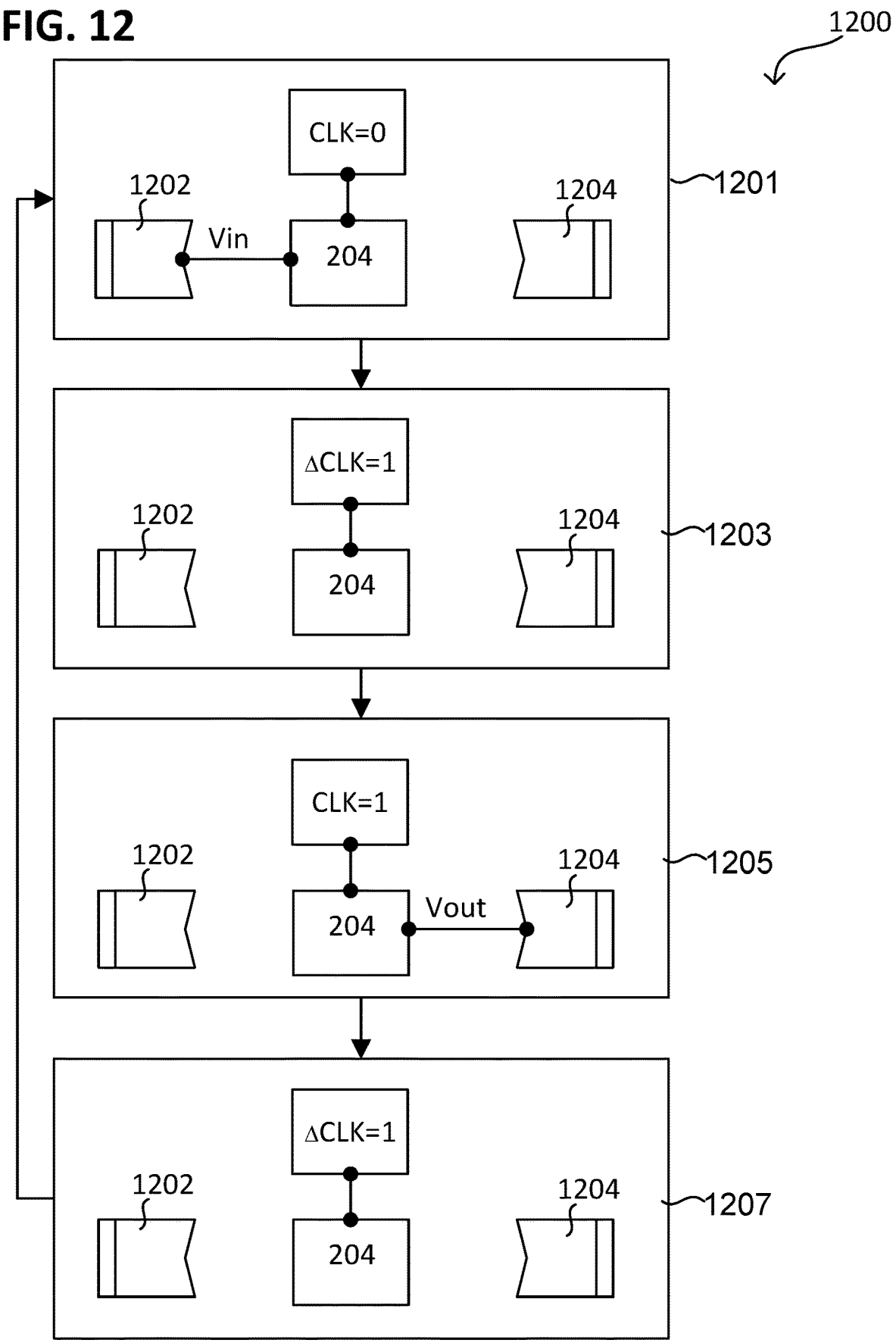
FIG. 12 shows method for operating a charge pump in a schematic flow diagram, according to various aspects.

FIG. 12 illustrates a method 1200 of operating a charge pump 104a, 104b, 114b according to various aspects in a schematic flow diagram. A charge pump may be used as up-converting charge pump (in the first operation mode) or as down-converting charge pump (in the second operation mode). The up-converting charge pump outputs an output voltage that is larger than the input voltage supplied to the up-converting charge pump. The down-converting charge pump outputs an output voltage that is less than the input voltage supplied to the down-converting charge pump.

An efficient voltage converter circuit 100 may be provided by charge pumps of the latch type (also referred as to Pelliconi charge pump) or charge pumps of the bootstrap type (also referred as to Dickson charge pump).

A charge pump of the latch type may include a so-called latch circuit. The latch circuit may include two cross-connected CMOS inverters (i.e., inverters in complementary metal oxide semiconductor technology), each CMOS inverter including two switches 1202, 1204 differing in channel conduction type from each other (i.e., having at least one NMOS switch and at least one PMOS switch). This allows the switches to be controlled by a common control signal, thus, reducing the complexity and switching delays. The charge storage 204 is coupled between the two switches that differ in channel conduction type from each other.

A charge pump of the bootstrap type includes two switches 1202, 1204 of the same conduction type (e.g., two PMOS switches or two NMOS switches). The charge storage 204 is coupled between the two switches that have the same conduction type. Therefore, a bootstrap charge pump may require less effort, e.g., if a large electrical voltage difference is to be generated. Additionally, or alternatively, less charge pumps per electrical voltage difference are required if using the bootstrap type.

The switches 1202, 1204 may provide the output and input of the respective charge pump, e.g., including the respective input node and output node of the charge pump. For example, input switch 1202 may include an input node of the charge pump. Analogously, output switch 1204 may include an output node of the charge pump. It is noted that adjacent bootstrap charge pumps may use a common switch between their charge storages. The control signal applied to the charge storage 204 may change between a high value (represented by 1) and a low value (represented by 0).

In the first operation mode, the charge pump may be operated in accordance with a pumping sequence as follows.

In a first phase 1201 of the pumping sequence, the control signal (CLK) applied to the charge storage is low and the input voltage Vin (e.g., EN_POS_NEG) is supplied to the charge storage 204, e.g., by switching the input switch 1202 to on. Further, the charge storage 204 may be decoupled (e.g., galvanically) from the output of the charge pump, e.g., by switching the output switch 1202 to off. Thereby, the charge storage 204 receives electrical charges via the input of the charge pump (also referred as to charging the charge storage 204).

In a second phase 1203 of the pumping sequence, the charge storage 204 is decoupled (e.g., galvanically) from the input and the output of the charge pump, e.g., by switching the input switch 1202 to off. Further, the control signal (CLK) applied to the charge storage is changed, represented by ΔCLK=1 (for example, ΔCLK=VDD). This causes the voltage of the charge storage to change from Vin to Vout (substantially without changing a charge of the charge storage 204). For example, the difference may be |Vin−Vout|=VDD (also referred as to pumping difference).

In a third phase 1205 of the pumping sequence, the control signal (CLK) applied to the charge storage is high and the output voltage Vout is supplied by the charge storage 204, e.g., by switching the output switch 1204 to on. Further, the charge storage 204 may be decoupled (e.g., galvanically) from the input of the charge pump, e.g., by switching the input switch 1202 to off.

The fourth phase 1207 of the pumping sequence may be similar to the second phase 1203, with the difference that the change of the control signal (CLK) in the fourth phase 1207 is opposite to the change of the control signal (CLK) in the second phase 1203.

Optionally, (e.g., at a low switching timing), the changes triggered by the second phase 1203 may be simultaneously to entering the third phase 1205; and the changes triggered by the fourth phase 1207 may be simultaneously to entering the third phase 1201.

The pumping sequence by repeated continuously in the first operation mode (e.g., along the direction of the arrows), e.g., from the first to the second phase and so on. By changing between the second operation mode and the first operation mode, the chronology of the pumping sequence is reversed (e.g., opposite the direction of the arrows). Thereby, the input and output of the charge pump may be swapped (see switches M2 and M4). The references made herein with regard to an input or output (e.g., nodes) of a charge pump may, therefore, be understood as example for the respective operation mode, for which the references are made.

The pumping sequence may be also repeated continuously in the second operation mode (e.g., opposite the direction of the arrows), e.g., from the fourth to the third phase and so on.

In the following, various examples are provided that may include one or more aspects described above with reference to the voltage converter circuit.

Example 1 is a voltage converter circuit, including: a first input node; a second input node; a first output node; a second output node; one or more charge pumps configured to convert a first input voltage supplied to the first input node up to a first output voltage (e.g., provided to the first output node) and to convert a second input voltage supplied to the second input node down to a second output voltage (e.g., provided to the second output node); and a control circuit to control an operation of the one or more charge pumps in accordance with a first operation mode (e.g., positive, up-converting) and a second operation mode (e.g., negative, down-converting), wherein, in the first operation mode, the control circuit is configured to supply the first input voltage to the first input node, leave the second input node floating, and output the first output voltage at the first output node, and wherein, in the second operation mode, the control circuit is configured to supply the second input voltage to the second input node, leave the first input node floating, and output the second output voltage at the second output node, wherein, for example, the one or more charge pumps include a first charge pump, a second charge pump and/or a third charge pump.

Example 2 is the voltage converter circuit of example 1, wherein the one or more charge pumps include one or more latch charge pumps.

Example 3 is the voltage converter circuit of example 1 or 2, wherein the one or more charge pumps include one or more bootstrap charge pumps.

Example 4 is the voltage converter circuit of any one of examples 1 to 3, wherein the one or more charge pumps include at least the first charge pump and the second charge pump coupled with one another, e.g., in a series connection and/or between the first input node and the second input node.

Example 5 is the voltage converter circuit of any one of examples 1 to 4, wherein the one or more charge pumps include at least the first charge pump, the second charge pump, and the third charge pump coupled with one another, e.g., in a series connection and/or between the first input node and the second input node.

Example 6 is the voltage converter circuit (e.g., the one or more charge pumps being of a latch type) of any one of examples 1 to 5, wherein the first input node is electrically conductively connected to the second output node; and wherein the second input node is electrically conductively connected to the first output node.

Example 7 is the voltage converter circuit (e.g., the one or more charge pumps being of a bootstrap type) of any one of examples 1 to 6, wherein a charge storage and/or a charge pump output node (in the first operation mode) of the first charge pump of the one or more charge pumps is electrically conductively connected to the second output node, e.g., via a first transistor connected in between.

Example 8 is the voltage converter circuit (e.g., the one or more charge pumps being of a bootstrap type) of any one of examples 1 to 7, wherein a charge storage and/or a charge pump output node (in the first operation mode) of the second of the one or more charge pumps charge pump is electrically conductively connected to the first output node, e.g., via a second transistor connected in between.

Example 9 is the voltage converter circuit (e.g., the one or more charge pumps being of a bootstrap type) of any one of examples 1 to 8, wherein a charge pump input node of the third charge pump (in the first operation mode) of the one or more charge pumps is electrically conductively connected to the first output node, e.g., via a second transistor connected in between.

Example 10 is the voltage converter circuit (e.g., the one or more charge pumps being of a bootstrap type) of any one of examples 1 to 9, wherein a charge storage and/or a charge pump output node of the third charge pump (in the first operation mode) of the one or more charge pumps is electrically conductively (e.g., ohmically) connected to the second input node.

Example 11 is the voltage converter circuit of any one of examples 1 to 10, further including: an output control circuit coupled to the first output node and the second output node to selectively output, at a common output node, either the first output voltage in the first operation mode or the second output voltage in the second operation mode. (e.g., controlled by the control circuit)

Example 12 is the voltage converter circuit of any one of examples 1 to 11, wherein at least one (e.g., each) charge pump of the one or more charge pumps includes one or more triple well transistors (as charge transfer switches), e.g., a set (e.g., two or more) of triple well transistors, each triple well transistor of the one or more triple well transistors including a first well (e.g., deep n-well) and second well (e.g., p-well), e.g., embedded in a substrate.

Example 13 is the voltage converter circuit of example 12, wherein the first well and the substrate (e.g., p-substrate) form a first well diode (also referred as to bottom diode), and/or wherein the first well and a second well (e.g., embedded in the first well) form a second well diode.

Example 14 is the voltage converter circuit (e.g., the one or more charge pumps being of a bootstrap type or a latch type, see for example, the exemplarily layout 1) of one of examples 12 to 13, wherein the first well of each triple well transistor of the one or more triple well transistors is electrically conductively connected to the second input node (for example, to the charge pump output node of the last charge pump in a series connection of the one or more charge pumps).

Example 15 is the voltage converter circuit (e.g., the one or more charge pumps being of a bootstrap type or a latch type, see for example, the exemplarily layout 1) of any one of examples 12 to 14, wherein a cathode of the first well diode (also referred as to the triple well diode) of each triple well transistor is electrically conductively connected to the second input node (e.g., to the charge pump output node of the last charge pump regarding a series connection of the one or more charge pumps).

Example 16 is the voltage converter circuit (e.g., the one or more charge pumps being of a bootstrap type or a latch type, see for example, the exemplarily layout 1) of any one of examples 12 to 15, wherein the first well of the one or more triple well transistors of a last charge pump of the one or more charge pumps (e.g., regarding a series connection of the one or more charge pumps) is electrically conductively connected to the second input node; and wherein the first well of the one or more triple well transistors of at least one other charge pump of the one or more charge pumps is connected to a corresponding auxiliary circuit, the auxiliary circuit being configured to supply a voltage to the respective first well of the at least one other charge pump, wherein the voltage is, in the second operation mode, substantially VSS (between VSS and $-V_{th}$ of the transistor of the auxiliary circuit) and is, in the first operation mode, in the range between the 110% and 210% of the input voltage of the at least one other charge pump.

Example 17 is the voltage converter circuit of any one of examples 1 to 16, wherein the first charge pump includes one or more first triple well transistors (e.g., as charge transfer switches), e.g., a first set (e.g., two or more) of triple well transistors, and the second charge pump includes one or more second triple well transistors (e.g., as charge transfer switches), e.g., a second set (e.g., two) of triple well transistors, each first triple well transistor and/or each second triple well transistor including a first well (e.g., deep n-well) and second well (e.g., p-well), e.g., embedded in a substrate.

Example 18 is the voltage converter circuit (e.g., the one or more charge pumps being of a bootstrap type or a latch type) of example 17, wherein the first well of each second triple well transistor of the one or more second triple well transistors is electrically conductively connected to a charge storage and/or charge pump output node of the second charge pump (output with reference to the first operation mode) or to the second supply node (e.g., if the second charge pump provides for the maximal positive stage, e.g., the #N charge pump).

Example 19 is the voltage converter circuit (e.g., the one or more charge pumps being of a bootstrap type, see, for example, exemplarily layouts 2 to 4) of example 18, further including: an auxiliary circuit, the auxiliary circuit including an input node electrically conductively connected to a charge storage and/or charge pump output node of the first charge pump; and the auxiliary circuit including an output node electrically conductively connected to the first well of each first triple well transistor of the one or more first triple well transistors to provide an auxiliary voltage thereto (the first charge pump may be in this case the minimal positive stage, e.g., the #1 charge pump)

Example 20 is the voltage converter circuit (e.g., the one or more charge pumps being of a bootstrap type, see, for example, exemplarily layout 2) of example 19, wherein the auxiliary circuit includes a plurality of triple well transistors configured such that, in the first operation mode, the auxiliary voltage is between an input voltage (e.g., VDD) of the first charge pump and an output voltage (e.g., 2·VDD) of the first charge pump, and, in the second operation mode, the auxiliary voltage is between an input voltage (e.g., −(N−1)·VDD) of the first charge pump and a base voltage (e.g., VSS or 0V).

Example 21 is the voltage converter circuit (e.g., the one or more charge pumps being of a bootstrap type, see, for example, exemplarily layout 2) of example 20, wherein each triple well transistor of the plurality of triple well transistors includes a threshold voltage $V_{th}$; wherein, in the first operation mode, the at least one triple well transistor (e.g., connected to the output node of the first charge pump) of the plurality of triple well transistors is off and the auxiliary voltage is provided to be about the output voltage (e.g., 2·VDD) of the first charge pump minus $V_{th}$; and/or wherein, in the second operation mode, the each triple well transistor of the plurality of triple well transistors is switch on (e.g., successively when entering the second operation mode) and the auxiliary voltage is provided to be about the input voltage (e.g., −(N−1)·VDD) of the first charge pump minus M times $V_{th}$, wherein M is the number of triple well transistor of the plurality of triple well transistors of the auxiliary circuit.

Example 22 is the voltage converter circuit (e.g., the one or more charge pumps being of a bootstrap type, see, for example, exemplarily layout 3) of one of examples 19 to 21, wherein the auxiliary circuit includes a (e.g., one) triple well transistor configured such that, in the first operation mode, the auxiliary voltage is between an input voltage (e.g., VDD) of the first charge pump and an output voltage (e.g., 2·VDD) of the first charge pump, and, in the second operation mode, the auxiliary voltage is between an input voltage (e.g., −(N−1)·VDD) of the first charge pump and a base voltage (e.g., VSS or 0V).

Example 23 is the voltage converter circuit (e.g., the one or more charge pumps being of a bootstrap type, see, for example, exemplarily layout 2) of one of examples 19 to 22, wherein the transistor includes a threshold voltage $V_{th}$, and, in the first operation mode, the transistor is on and the auxiliary voltage is provided to be about the output voltage (e.g., 2·VDD) of the first charge pump minus $V_{th}$; and/or wherein, in the second operation mode, the transistor is off and the first well of each of the triple well transistors of the first set of triple well transistors is floating and may therefore stay at about VSS or 0V, wherein, for example, the voltage may drop to or by $-V_{th}$ but not further.

Example 24 is the voltage converter circuit (e.g., the one or more charge pumps being of a bootstrap type, see, for example, exemplarily layout 4) of one of examples 19 to 23, wherein the auxiliary circuit includes one or more triple well transistors and an auxiliary voltage supply configured such that, in the first operation mode, the auxiliary voltage is between an input voltage (e.g., VDD) of the first charge pump and an output voltage (e.g., 2·VDD) of the first charge pump, and, in the second operation mode, the auxiliary voltage is provided by the auxiliary voltage supply, wherein, for example, the auxiliary voltage supply may supply the base voltage (e.g., VSS or 0V) as auxiliary voltage.

Example 25 is the voltage converter circuit (e.g., the one or more charge pumps being of a bootstrap type, see, for example, exemplarily layout 4) of one of examples 19 to 24, wherein the transistor includes a threshold voltage $V_{th}$ and, in the first operation mode, the transistor is on and the auxiliary voltage is provided to be about the output voltage (e.g., 2·VDD) of the first charge pump minus $V_{th}$, e.g., when the auxiliary voltage supply is off.

Example 26 is the voltage converter circuit (e.g., the one or more charge pumps being of a bootstrap type, see, for example, exemplarily layout 4) of one of examples 19 to 25, wherein, in the second operation mode, the transistor is off and the first well of each first triple well transistor of the first triple well transistor is supplied with VSS or 0V via the auxiliary voltage supply (e.g., when being on).

Example 27 is the voltage converter circuit (e.g., the one or more charge pumps being of a bootstrap type, see, for example, exemplarily layouts 3 to 4) of one of examples 19 to 26, wherein the auxiliary circuit includes one or more triple well transistors configured such that, in the first operation mode, the auxiliary voltage is between an input voltage (e.g., VDD) of the first charge pump and an output voltage (e.g., 2·VDD−$V_{th}$) of the first charge pump.

Example 28 is the voltage converter circuit (e.g., the one or more charge pumps being of a bootstrap type or latch type) of any one of examples 1 to 27, wherein the first charge pump includes one or more first a first triple well transistors (as charge transfer switches), e.g., a first set (e.g., two) of first triple well transistors, the second charge pump includes one or more second a first triple well transistors (as charge transfer switches), e.g., a second set (e.g., two) of second triple well transistors, and the third charge pump includes one or more third a first triple well transistors (as charge transfer switches), e.g., a third set (e.g., two) of third triple well transistors, each triple well transistor of the one or more first triple well transistors, one or more second triple well transistors and one or more third triple well transistors including a first well (e.g., deep n-well) and second well (e.g., p-well).

Example 29 is the voltage converter circuit (e.g., the one or more charge pumps being of a bootstrap type or latch type) of example 28, wherein the first well of each triple well transistors of the one or more third triple well transistors is electrically conductively connected to a charge storage and/or charge pump output node of the third charge pump or to the second supply node (e.g., if the third charge pump provides the maximal positive stage, e.g., the #N stage).

Example 30 is the voltage converter circuit (e.g., the one or more charge pumps being of a bootstrap type, see, for example, exemplarily layouts 2 to 4) of example 28 or 29, further including: a first auxiliary circuit, the first auxiliary circuit including an input node electrically conductively connected to a charge storage and/or charge pump output node of the first charge pump, and the first auxiliary circuit including an output node electrically conductively connected to the first well of each triple well transistor of the one or more first triple well transistors to provide a first auxiliary voltage thereto; and a second auxiliary circuit, the second auxiliary circuit including an input node electrically conductively connected to a charge storage and/or charge pump output node of the second charge pump, and the second auxiliary circuit including an output node electrically conductively connected to the first well of each triple well transistor of the one or more second triple well transistors to provide a second auxiliary voltage thereto (e.g., if the first charge pump provides the minimal positive stage, e.g., the #1 stage).

Example 31 is the voltage converter circuit (e.g., the one or more charge pumps being of a bootstrap type, see, for example, exemplarily layout 2) of example 30, wherein the first auxiliary circuit includes a plurality of triple well transistors configured such that, in the first operation mode, the first auxiliary voltage is between an input voltage (e.g., VDD) of the first charge pump and an output voltage (e.g., 2·VDD) of the first charge pump, and, in the second operation mode, the first auxiliary voltage is between an input voltage (e.g., −(N−1)·VDD) of the first charge pump and a base voltage (e.g., VSS or 0V); and wherein the second auxiliary circuit includes a plurality of triple well transistors configured such that, in the first operation mode, the second auxiliary voltage is between an input voltage (e.g., 2·VDD) of the second charge pump and an output voltage (e.g., 3·VDD) of the second charge pump, and, in the second operation mode, the second auxiliary voltage is between an input voltage (e.g., −(N−2)·VDD) of the second charge pump and a base voltage (e.g., VSS or 0V).

Example 32 is the voltage converter circuit (e.g., the one or more charge pumps being of a bootstrap type, see, for example, exemplarily layout 2) of example 31, for each charge pump having an auxiliary circuit associated therewith: wherein, for example, each triple well transistor of the plurality of triple well transistors include a threshold voltage $V_{th}$ and, in the first operation mode, the at least one triple well transistor (e.g., connected to the output node and/or the charge storage of the first charge pump) is off and the auxiliary voltage is provided to be about the output voltage (e.g., 2VDD or 3VDD) of the first charge pump minus $V_{th}$; and/or wherein, for example, in the second operation mode, the each triple well transistor of the plurality of triple well transistors is switch on (e.g., successively when entering the second op) and the auxiliary voltage is provided to be about the input voltage (e.g., −(N−1) or −(M−2)·VDD) of the first charge pump minus M times $V_{th}$, wherein M is the number of triple well transistors within the auxiliary circuit.

Example 33 is the voltage converter circuit (e.g., the one or more charge pumps being of a bootstrap type, see, for example, exemplarily layout 3) of example 30, wherein the first auxiliary circuit includes one or more triple well transistors configured such that, in the first operation mode, the first auxiliary voltage is between an input voltage (e.g., VDD) of the first charge pump and an output voltage (e.g., 2·VDD) of the first charge pump, and, in the second operation mode, the first auxiliary voltage is between an input voltage (e.g., −(N−1)·VDD) of the first charge pump and a base voltage (e.g., VSS or 0V); and wherein the second auxiliary circuit includes one or more triple well transistors configured such that, in the first operation mode, the second auxiliary voltage is between an input voltage (e.g., 2·VDD) of the second charge pump and an output voltage (e.g., 3·VDD) of the second charge pump, and, in the second operation mode, the second auxiliary voltage is between an input voltage (e.g., −(N−2)·VDD) of the first charge pump and a base voltage (e.g., being the second input voltage, being VSS and/or being 0V).

Example 34 is the voltage converter circuit (e.g., the one or more charge pumps being of a bootstrap type, see, for example, exemplarily layout 2) of example 33, for each charge pump having an auxiliary circuit associated therewith: wherein, for example, the one or more triple well transistors of the first auxiliary circuit include a threshold voltage $V_{th}$ and, in the first operation mode, the one or more triple well transistors of the first auxiliary circuit are on and the auxiliary voltage is provided to be about the output voltage (e.g., 2VDD or 3VDD) of the first charge pump minus $V_{th}$; and/or wherein, for example, in the second operation mode, the one or more triple well transistors of the first auxiliary circuit are off and the first well of each first triple well transistors of the one or more first triple well transistors is floating and maintains at about VSS or 0V.

Example 35 is the voltage converter circuit (e.g., the one or more charge pumps being of a bootstrap type, see, for example, exemplarily layout 4) of example 30, wherein the first auxiliary circuit includes one or more triple well transistors and a first auxiliary voltage supply configured such that, in the first operation mode, the first auxiliary voltage is between an input voltage (e.g., VDD) of the first charge pump and an output voltage (e.g., 2·VDD) of the first charge pump, and, in the second operation mode, the first auxiliary voltage is provided by the first auxiliary voltage supply; and/or wherein the second auxiliary circuit includes one or more triple well transistors and a second auxiliary voltage supply configured such that, in the first operation mode, the second auxiliary voltage is between an input voltage (e.g., 2·VDD) of the second charge pump and an output voltage (e.g., 3·VDD) of the second charge pump, and, in the second operation mode, the second auxiliary voltage is provided by the second auxiliary voltage supply.

Example 36 is the voltage converter circuit (e.g., the one or more charge pumps being of a bootstrap type, see, for example, exemplarily layout 4) of example 35, wherein the first and/or second auxiliary voltage supplies may supply the base voltage (VSS or 0V) as auxiliary voltages.

Example 37 is the voltage converter circuit (e.g., the one or more charge pumps being of a bootstrap type, see, for example, exemplarily layout 4) of example 36, for each charge pump having an auxiliary circuit associated therewith: wherein, for example, the one or more transistors of the auxiliary circuit include a threshold voltage $V_{th}$ and, in the first operation mode, the one or more transistors are on and the auxiliary voltage is provided to be about the output voltage (e.g., 2VDD) of the charge pump minus $V_{th}$, for example, if the auxiliary voltage supply is off; and/or wherein, for example, in the second operation mode, the one or more transistors of the auxiliary circuit are off and the first well of each triple well transistor of charge pump is supplied with VSS or 0V via the auxiliary voltage supply that is on.

Example 38 is the voltage converter circuit (e.g., the one or more charge pumps being of a bootstrap type, see, for example, exemplarily layouts 3 to 4) of example 30, wherein the first auxiliary circuit includes a triple well transistor configured such that, in the first operation mode, the first auxiliary voltage is between an input voltage (e.g., VDD) of the first charge pump and an output voltage (e.g., 2·VDD) of the first charge pump; and wherein the second auxiliary circuit includes a triple well transistor configured such that, in the first operation mode, the second auxiliary voltage is between an input voltage (e.g., 2·VDD) of the second charge pump and an output voltage (e.g., 3·VDD) of the second charge pump.

Example 39 is the voltage converter circuit of any one of examples 1 to 38, wherein, in the first operation mode, the one or more charge pumps are operated in accordance with a first pumping sequence (e.g., to provide the first output voltage based on the first input voltage); and wherein, in the second operation mode, the one or more charge pumps are operated in accordance with a second pumping sequence (e.g., to provide the second output voltage based on the second input voltage), wherein, for example, the second pumping sequence and the first pumping sequence differ from each other.

Example 40 is the voltage converter circuit of any one of examples 1 to 39, wherein, in the first operation mode, the first output voltage is larger than the first input voltage; and/or wherein, in the second operation mode, the second output voltage is less than the second input voltage.

Example 41 is the voltage converter circuit of any one of examples 1 to 40, wherein the auxiliary voltage in the first operation mode differs from the auxiliary voltage in the second operation mode.

Example 42 is the voltage converter circuit of any one of examples 1 to 41, wherein at least one charge pump of the one or more charge pumps is coupled between the first output node and the second output node.

Example 43 is the voltage converter circuit of any one of examples 1 to 42, wherein at least one charge pump of one or more charge pumps is coupled between the first input node and the second output node; and/or wherein at least one further charge pump of one or more charge pumps is coupled between the second input node and the first output node.

Example 44 is a voltage converter circuit, including: an input node (e.g., the operation mode node) and an output node (e.g., common output node); one or more charge pumps; a control circuit to control an operation of the one or more charge pumps in accordance with a first operation mode (e.g., up-converting operation mode) and a second operation mode (e.g., down-converting operation mode); wherein, in the first operation mode, the one or more charge pumps are operated in accordance with a first pumping sequence to provide a first output voltage based on an input voltage at the input node, wherein the first output voltage is larger than the input voltage; wherein, in the second operation mode, the one or more charge pumps are operated in accordance with a second pumping sequence to provide a second output voltage based on the input voltage at the input node, wherein the second output voltage is less than the input voltage at the input node; wherein, the control circuit is configured, to provide, in the first operation mode, the first output voltage at the output node, and to provide, in the second operation mode, the second output voltage at the output node; wherein, for example, the second pumping sequence and the first pumping sequence differ from each other (e.g., by their chronology), wherein, for example, the second pumping sequence is a (e.g., chronological) reverse of the first pumping sequence; wherein the voltage converter circuit is optionally further configured in accordance with the voltage converter circuit of one of examples 1 to 43.

Example 45 is a voltage converter circuit, including: a first node (e.g., the first input node) and a second node (e.g., the second input node); one or more charge pumps (e.g., each) including a triple well device, wherein the one or more charge pumps are configured to convert between a first voltage at the first node and a second voltage at the second node (e.g., the second voltage being greater than the first voltage); wherein the triple well device includes a bipolar isolating well, an auxiliary circuit configured to provide an auxiliary voltage (e.g., based on the second voltage) and to supply the auxiliary voltage to the bipolar isolating well (e.g., depending in the direction of the converting), wherein the auxiliary voltage is optionally less than the second voltage, wherein a difference between the auxiliary voltage and the second voltage is optionally a function of a difference of the first voltage to the second voltage; wherein the voltage converter circuit includes optionally a control circuit configured to switch the operation of the one or more charge pumps between a first operation mode (e.g., up-converting operation mode) and a second operation mode (e.g., down-converting operation mode), wherein, in the first operation mode, the first voltage is converted into the second voltage, wherein, in the second operation mode, the second voltage is converted into the first voltage; wherein the voltage converter circuit is optionally further configured in accordance with the voltage converter circuit of one of examples 1 to 44.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A voltage converter circuit, comprising:
   a first input node;
   a second input node;
   a first output node;
   a second output node;
   one or more charge pumps configured to convert a first input voltage supplied to the first input node up to a first output voltage and to convert a second input voltage supplied to the second input node down to a second output voltage; and
   a control circuit to control an operation of the one or more charge pumps in accordance with a first operation mode and a second operation mode,
   wherein, in the first operation mode, the control circuit is configured to supply the first input voltage to the first input node, leave the second input node floating, and supply the first output voltage to the first output node, and
   wherein, in the second operation mode, the control circuit is configured to supply the second input voltage to the second input node, leave the first input node floating, and supply the second output voltage to the second output node.

2. The voltage converter circuit of claim 1,
   wherein the one or more charge pumps comprise one or more latch charge pumps.

3. The voltage converter circuit of claim 1,
   wherein the one or more charge pumps comprise one or more bootstrap charge pumps.

4. The voltage converter circuit of claim 1,
   wherein the one or more charge pumps comprise at least a first charge pump and a second charge pump coupled with one another in a series connection between the first input node and the second input node.

5. The voltage converter circuit of claim 4,
   wherein a charge storage and/or a charge pump output node of the first charge pump is electrically conductively connected to the second output node via a first transistor connected in between.

6. The voltage converter circuit of claim 5,
   wherein a charge storage and/or a charge pump output node of the second charge pump is electrically conductively connected to the first output node via a second transistor connected in between.

7. The voltage converter circuit of claim 1, further comprising:
   an output control circuit coupled to the first output node and the second output node to selectively output, at a common output node, either the first output voltage in the first operation mode or the second output voltage in the second operation mode.

8. The voltage converter circuit of claim 1,
wherein at least one charge pump of the one or more charge pumps comprises one or more triple well transistors, each of the one or more triple well transistors comprises a first well and a second well.

9. The voltage converter circuit of claim 8,
wherein the first well is electrically conductively connected to the second input node.

10. The voltage converter circuit of claim 8, further comprising:
an auxiliary circuit, the auxiliary circuit comprising an input node electrically conductively connected to a charge storage and/or a charge pump output node of the at least one charge pump; and the auxiliary circuit comprising an output node electrically conductively connected to the first well to provide an auxiliary voltage thereto.

11. The voltage converter circuit of claim 10,
wherein the auxiliary circuit comprises one or more transistors coupled in series between the input node of the auxiliary circuit and the output node of the auxiliary circuit; wherein preferably each of the one or more transistors is a triple well transistor.

12. The voltage converter circuit of claim 11,
wherein the auxiliary circuit comprises further an auxiliary voltage supply, wherein the auxiliary voltage is provided by the auxiliary voltage supply only in the second operation mode and by the one or more transistors only in the first operation mode.

13. The voltage converter circuit of claim 10,
wherein the auxiliary voltage provided in the first operation mode differs from the auxiliary voltage provided in the second operation mode.

14. The voltage converter circuit of claim 13,
wherein, in the first operation mode, the auxiliary voltage is between an input voltage of the at least one charge pump and an output voltage of the at least one charge pump, and, in the second operation mode, the auxiliary voltage is between an input voltage of a first charge pump and the second input voltage.

15. The voltage converter circuit of claim 1,
wherein the first input node is electrically conductively connected to the second output node; and
wherein the second input node is electrically conductively connected to the first output node.

16. The voltage converter circuit of claim 1,
wherein at least one charge pump of one or more charge pumps is coupled between the first input node and the second output node; and/or
wherein at least one further charge pump of one or more charge pumps is coupled between the second input node and the first output node.

17. The voltage converter circuit of claim 1,
wherein, in the first operation mode, the one or more charge pumps are operated in accordance with a first pumping sequence to convert the first input voltage to the first output voltage; and
wherein, in the second operation mode, the one or more charge pumps are operated in accordance with a second pumping sequence to convert the second input voltage to the second output voltage;
wherein the second pumping sequence and the first pumping sequence differ from each other.

18. The voltage converter circuit of claim 1,
wherein at least one charge pump of the one or more charge pumps is coupled between the first output node and the second output node.

* * * * *